US009776332B2

(12) United States Patent
Oh et al.

(10) Patent No.: US 9,776,332 B2
(45) Date of Patent: Oct. 3, 2017

(54) AUTOMATIC MOVING APPARATUS AND MANUAL OPERATION METHOD THEREOF

(75) Inventors: Seokbyung Oh, Seoul (KR); Jiwoon Hwang, Seoul (KR); Kwonyul Choi, Seoul (KR); Hyungshin Park, Yongin-Si (KR)

(73) Assignee: LG ELECTRONICS INC., Seoul (KR)

( * ) Notice: Subject to any disclaimer, the term of this patent is extended or adjusted under 35 U.S.C. 154(b) by 285 days.

(21) Appl. No.: 14/354,493

(22) PCT Filed: Dec. 8, 2011

(86) PCT No.: PCT/KR2011/009492
§ 371 (c)(1),
(2), (4) Date: Apr. 25, 2014

(87) PCT Pub. No.: WO2013/085085
PCT Pub. Date: Jun. 13, 2013

(65) Prior Publication Data
US 2014/0303775 A1 Oct. 9, 2014

(51) Int. Cl.
*B25J 9/16* (2006.01)
*B25J 9/00* (2006.01)
(Continued)

(52) U.S. Cl.
CPC ........... *B25J 9/1697* (2013.01); *B25J 9/0003* (2013.01); *G05D 1/0016* (2013.01);
(Continued)

(58) Field of Classification Search
CPC .. G05D 1/0011; G05D 1/0016; G05D 1/0038; G05D 1/0044; G05D 1/0094;
(Continued)

(56) References Cited

U.S. PATENT DOCUMENTS

| 4,674,048 A | * | 6/1987 | Okumura | B25J 9/1676 |
| | | | | 318/568.12 |
| 5,023,788 A | * | 6/1991 | Kitazume | G05D 1/027 |
| | | | | 180/7.1 |

(Continued)

FOREIGN PATENT DOCUMENTS

| JP | 2002-85305 A | 3/2002 |
| JP | 2002-321180 A | 11/2002 |

(Continued)

*Primary Examiner* — Thomas G Black
*Assistant Examiner* — Sara Lewandroski
(74) *Attorney, Agent, or Firm* — Birch, Stewart, Kolasch & Birch, LLP

(57) ABSTRACT

Various interfaces allowing users to directly manipulate an automatic moving apparatus manually, thus enhancing user convenience and efficiency, are provided. An automatic moving apparatus includes: a storage unit configured to store a traveling method; an image detection unit configured to acquire a captured image; a driving unit having one or more wheels and driving the wheels according to a driving signal; and a control unit configured to extract a traveling direction from the traveling method stored in the storage unit in a first mode, extract a traveling direction indicated by a sensing target from the captured image acquired by the image detection unit in a second mode, and generate a driving signal for moving the automatic moving apparatus in the extracted traveling direction.

8 Claims, 18 Drawing Sheets

(51) Int. Cl.
*G05D 1/00* (2006.01)
*G05D 1/02* (2006.01)

(52) U.S. Cl.
CPC ......... *G05D 1/0033* (2013.01); *G05D 1/0038* (2013.01); *A47L 2201/04* (2013.01); *B25J 9/1612* (2013.01); *B25J 9/1689* (2013.01); *G05D 1/0276* (2013.01); *G05D 2201/0203* (2013.01)

(58) Field of Classification Search
CPC .... G05D 2201/0203; G05D 1/00; G05D 1/02; G05D 1/021; G05D 1/0033; G05D 3/00; G05D 1/0212; G05D 1/0246; G05D 1/0276; A47L 2201/00; A47L 2201/04; A47L 2201/06; B25J 9/0003; B25J 9/16; B25J 9/1689; B25J 9/1697; B25J 9/1612; B25J 9/1679; B25J 9/1694; B25J 9/0081; B25J 3/00; B25J 3/02; B25J 3/04
USPC ...................................... 700/257, 264; 701/2
See application file for complete search history.

(56) References Cited

U.S. PATENT DOCUMENTS

| | | | | |
|---|---|---|---|---|
| 6,457,206 B1 * | 10/2002 | Judson | A47L 11/34 | 15/320 |
| 6,480,768 B1 * | 11/2002 | Torii | B62D 1/28 | 180/167 |
| 6,507,773 B2 * | 1/2003 | Parker | G06N 3/008 | 318/568.11 |
| 7,526,362 B2 * | 4/2009 | Kim | G08C 23/04 | 318/567 |
| 8,195,331 B2 * | 6/2012 | Myeong | G05D 1/0274 | 134/18 |
| 8,577,126 B2 * | 11/2013 | Jones | G06F 3/017 | 348/114 |
| 8,606,404 B1 * | 12/2013 | Huffman | B25J 9/1697 | 700/259 |
| 8,996,224 B1 * | 3/2015 | Herbach | G05D 1/0011 | 180/116 |
| 9,211,648 B2 * | 12/2015 | Grinstead | B25J 19/023 | |
| 2001/0037163 A1 * | 11/2001 | Allard | B25J 9/1689 | 700/245 |
| 2002/0153185 A1 * | 10/2002 | Song | A47L 9/009 | 180/167 |
| 2002/0193908 A1 * | 12/2002 | Parker | G06N 3/008 | 700/258 |
| 2003/0030398 A1 * | 2/2003 | Jacobs | G05D 1/0274 | 318/568.12 |
| 2003/0229421 A1 * | 12/2003 | Chmura | A47L 5/36 | 700/245 |
| 2004/0083570 A1 * | 5/2004 | Song | A47L 9/009 | 15/319 |
| 2004/0088081 A1 * | 5/2004 | Song | A47L 9/2805 | 700/259 |
| 2005/0171644 A1 * | 8/2005 | Tani | A47L 9/009 | 700/253 |
| 2006/0020369 A1 * | 1/2006 | Taylor | A47L 9/009 | 700/245 |
| 2006/0061657 A1 * | 3/2006 | Rew | H04N 7/181 | 348/151 |
| 2006/0155436 A1 * | 7/2006 | Matsunaga | G05D 1/0214 | 701/23 |
| 2006/0217837 A1 * | 9/2006 | Koga | G05D 1/0246 | 700/245 |
| 2008/0027590 A1 * | 1/2008 | Phillips | G05D 1/0088 | 701/2 |
| 2009/0055020 A1 * | 2/2009 | Jeong | G05D 1/0246 | 700/251 |
| 2010/0023185 A1 * | 1/2010 | Terwelp | G01S 17/023 | 701/2 |
| 2011/0071674 A1 * | 3/2011 | Jeon | B25J 13/00 | 700/246 |
| 2011/0106339 A1 * | 5/2011 | Phillips | G05D 1/0033 | 701/2 |
| 2011/0221692 A1 * | 9/2011 | Seydoux | A63H 27/12 | 345/173 |
| 2011/0245974 A1 * | 10/2011 | Kawamoto | B25J 9/1664 | 700/259 |
| 2011/0264305 A1 * | 10/2011 | Choe | G05D 1/0246 | 701/2 |
| 2011/0288684 A1 * | 11/2011 | Farlow | B25J 11/009 | 700/264 |
| 2012/0072052 A1 * | 3/2012 | Powers | G05D 1/0044 | 701/2 |
| 2012/0166024 A1 * | 6/2012 | Phillips | G05D 1/0088 | 701/2 |
| 2012/0168240 A1 * | 7/2012 | Wilson | A63H 30/04 | 180/167 |
| 2012/0185095 A1 * | 7/2012 | Rosenstein | B25J 5/007 | 700/259 |
| 2012/0191287 A1 * | 7/2012 | Shin | G05D 1/027 | 701/28 |
| 2012/0197439 A1 * | 8/2012 | Wang | B25J 9/1689 | 700/259 |
| 2012/0215380 A1 * | 8/2012 | Fouillade | G05D 1/0038 | 701/2 |
| 2012/0221187 A1 * | 8/2012 | Jeon | A47L 9/009 | 701/26 |
| 2012/0259481 A1 * | 10/2012 | Kim | G05D 1/0016 | 701/2 |
| 2012/0265370 A1 * | 10/2012 | Kim | G07C 5/0841 | 701/2 |
| 2012/0277914 A1 * | 11/2012 | Crow | G05D 1/0094 | 700/259 |
| 2013/0056032 A1 * | 3/2013 | Choe | A47L 9/0488 | 134/18 |
| 2014/0116469 A1 * | 5/2014 | Kim | A47L 9/2894 | 134/18 |
| 2014/0136414 A1 * | 5/2014 | Abhyanker | G06Q 50/28 | 705/44 |
| 2015/0025708 A1 * | 1/2015 | Anderson | A61B 5/6804 | 701/2 |
| 2015/0177736 A1 * | 6/2015 | Anderson | G05D 1/0274 | 701/25 |

FOREIGN PATENT DOCUMENTS

| | | | |
|---|---|---|---|
| JP | 2006-321001 A | | 11/2006 |
| KR | 100821162 B1 | * | 4/2008 |
| KR | 10-2010-0045585 A | | 5/2010 |
| WO | WO 2011146259 A2 | * | 11/2011 ............. B25J 5/007 |

* cited by examiner

[Fig. 1]
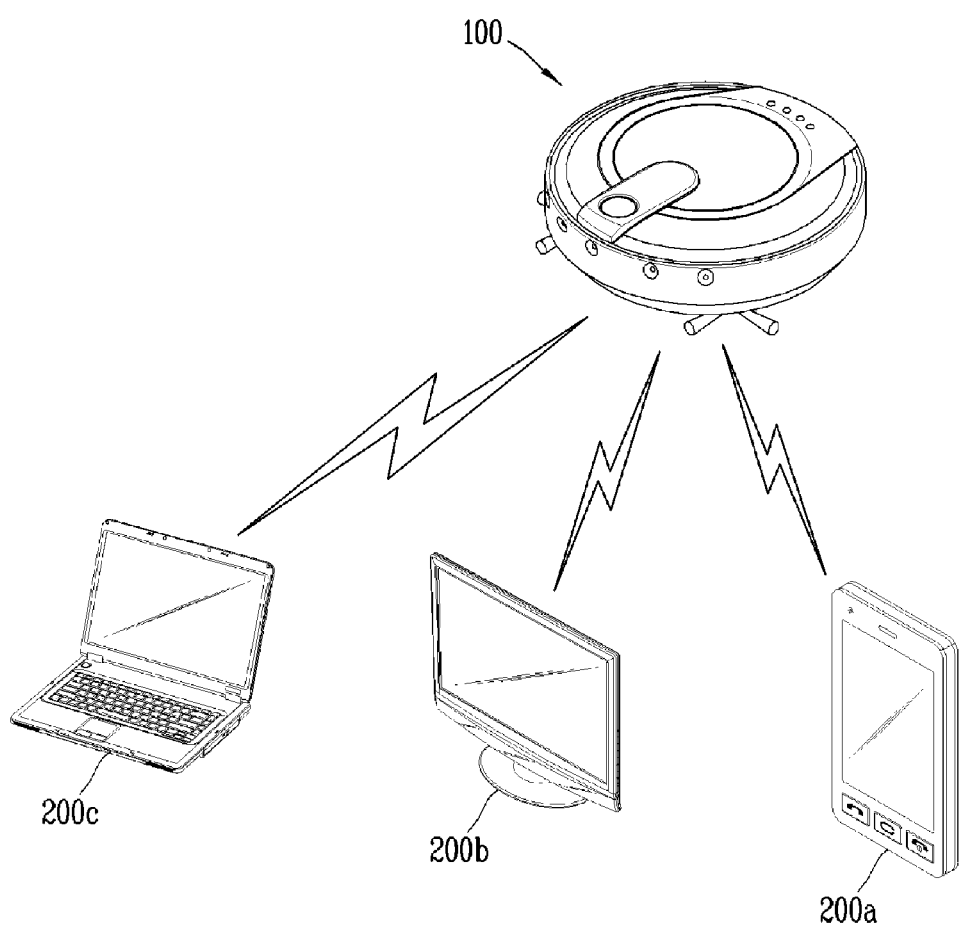

[Fig. 2]
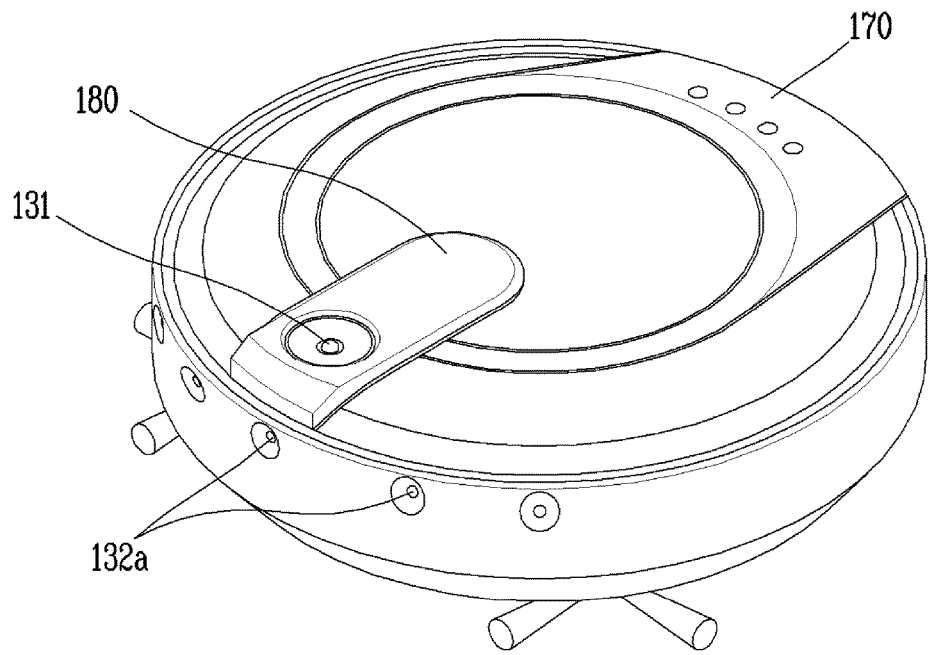
[Fig. 3]
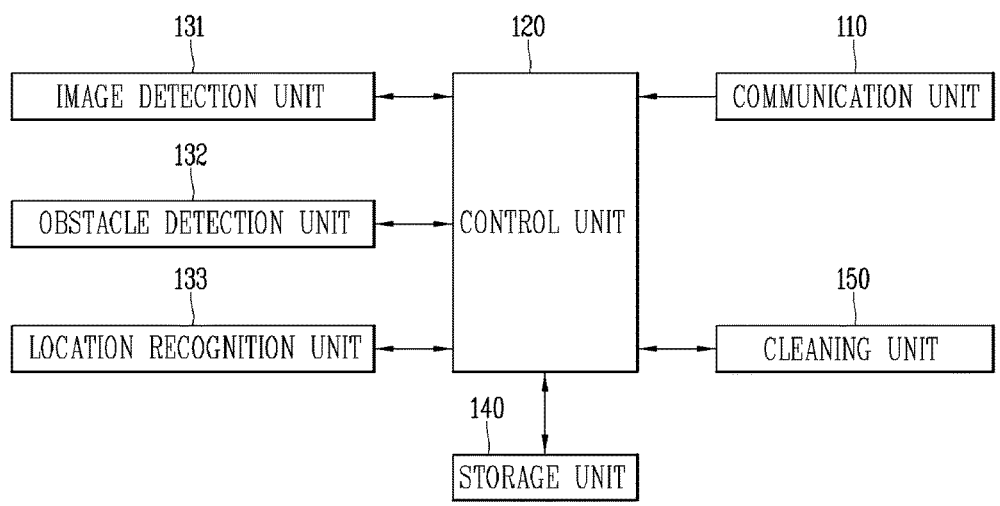

[Fig. 4]
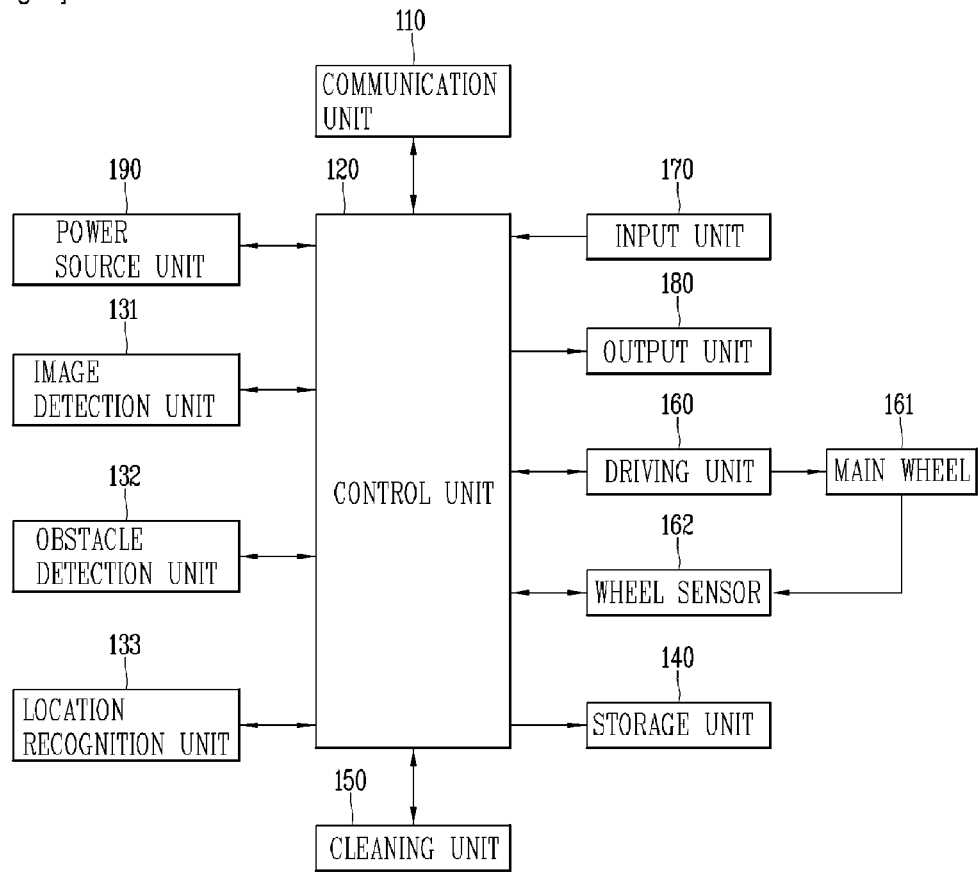
[Fig. 5]
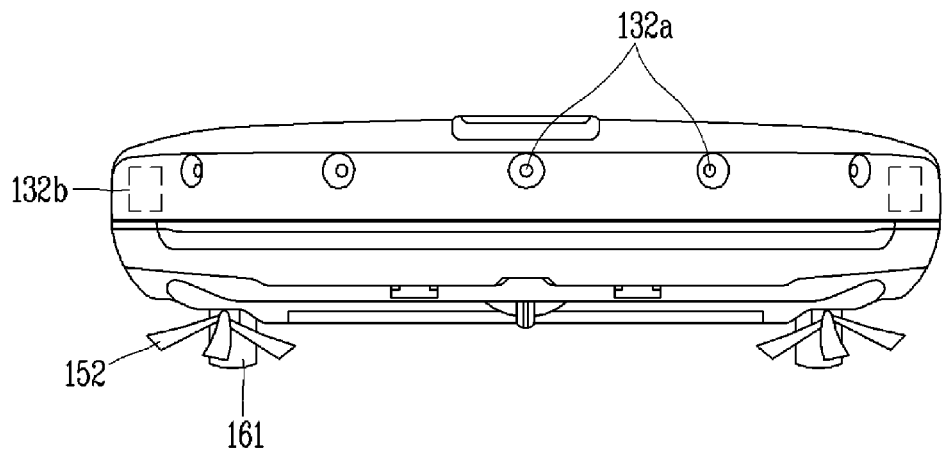

[Fig. 6]
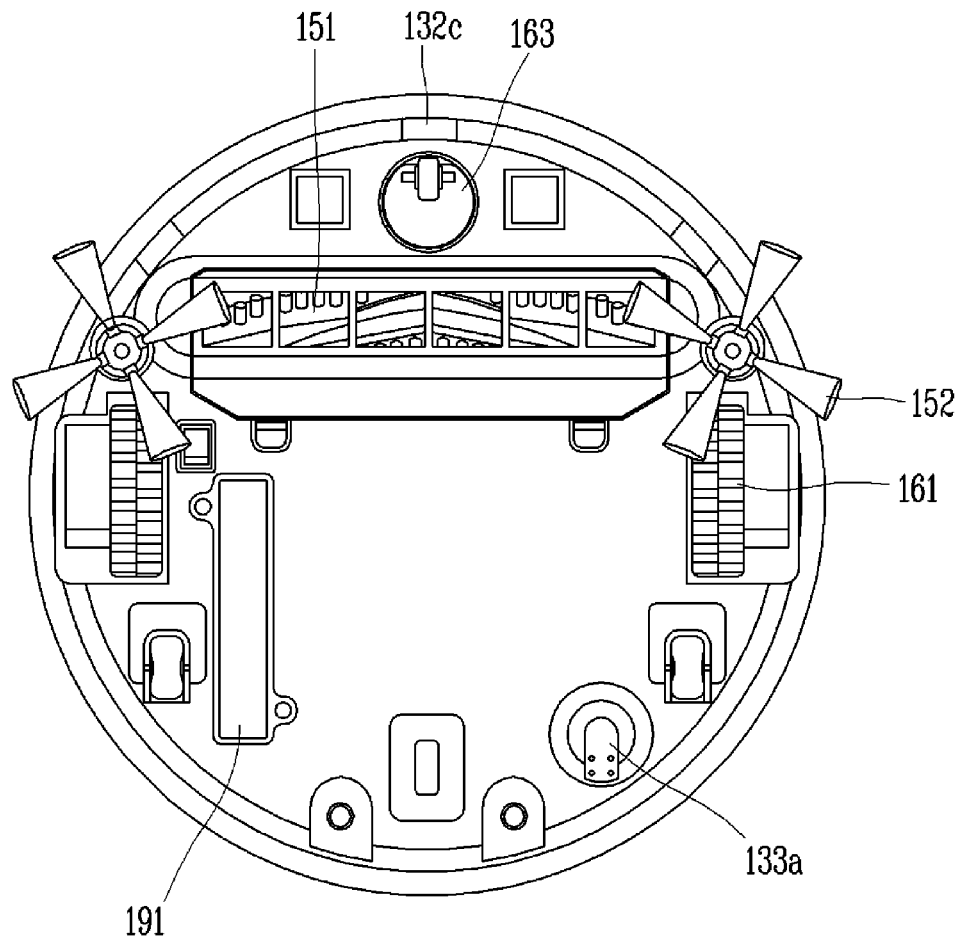
[Fig. 7]
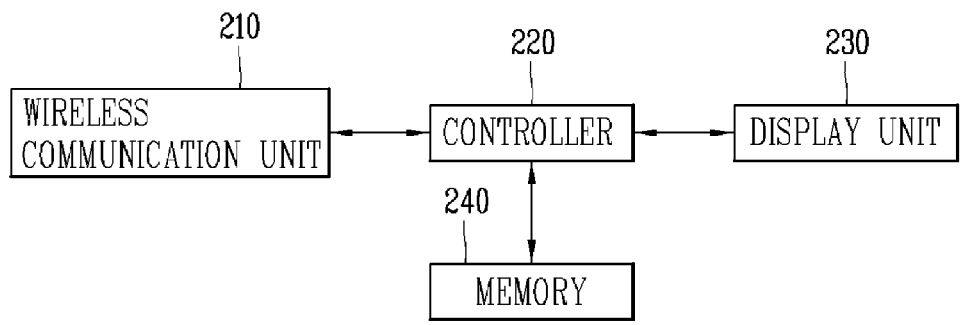

[Fig. 8]
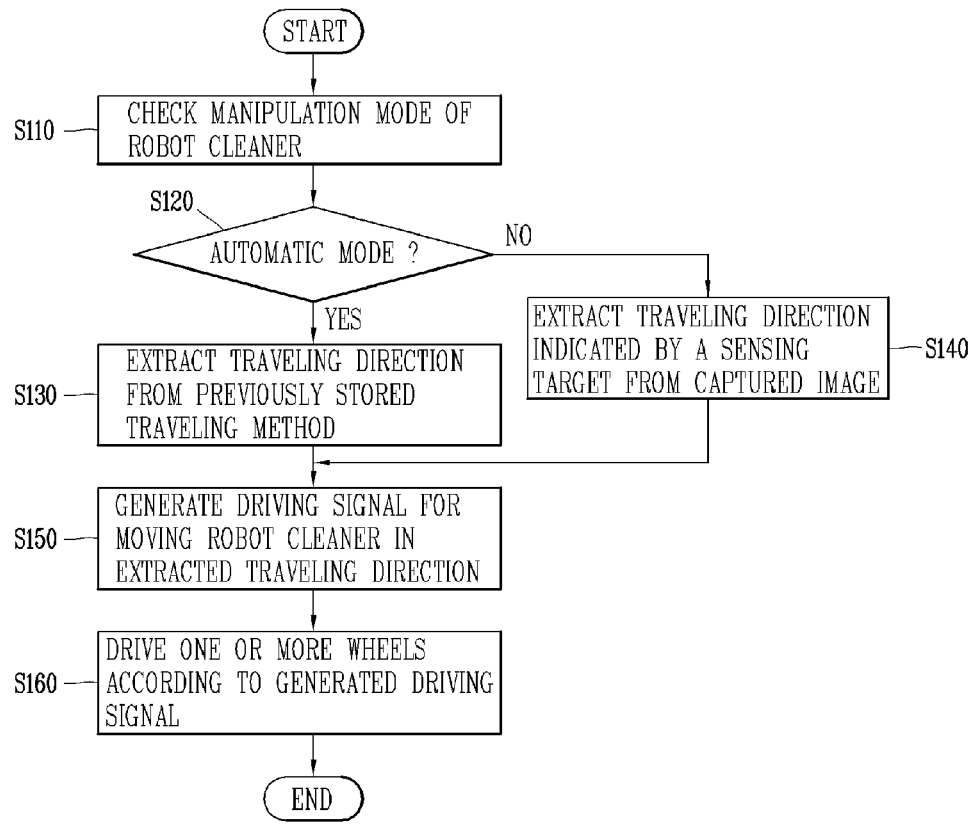
[Fig. 9a]
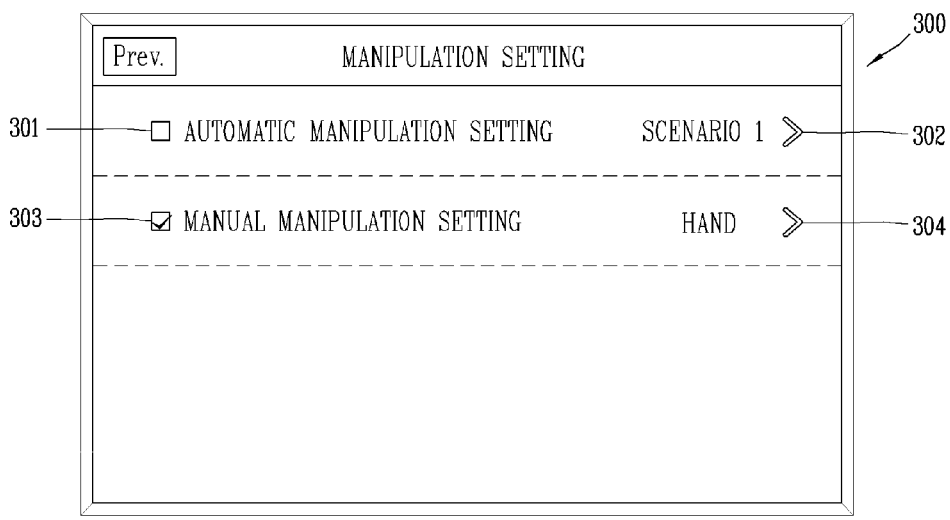

[Fig. 9b]
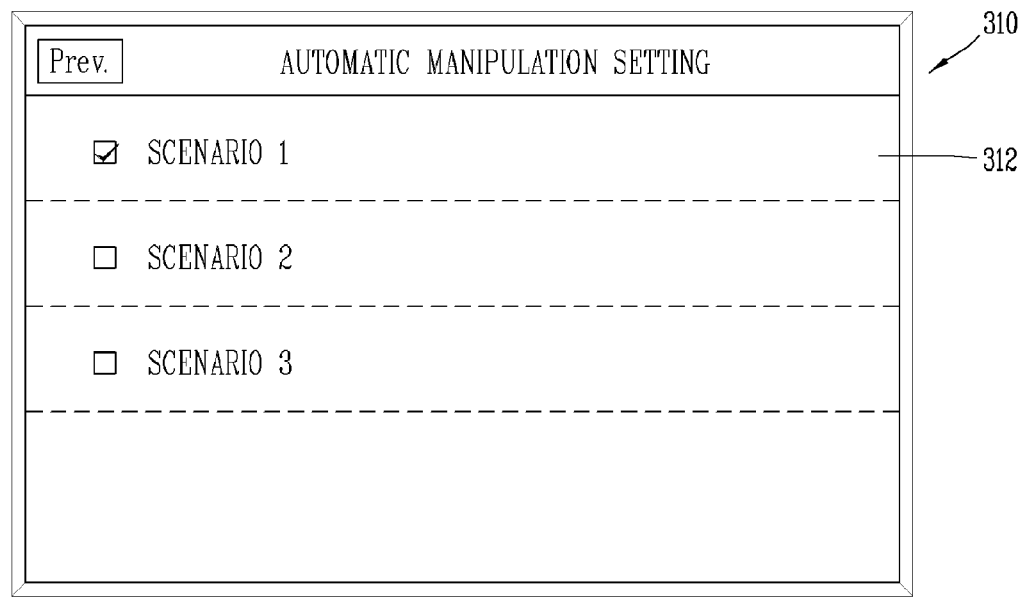
[Fig. 9c]
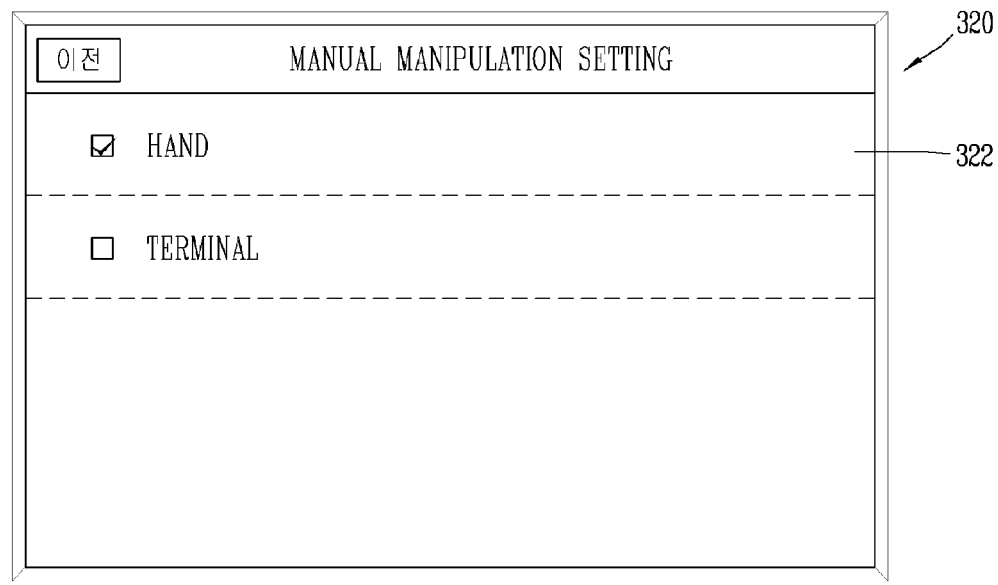

[Fig. 10a]
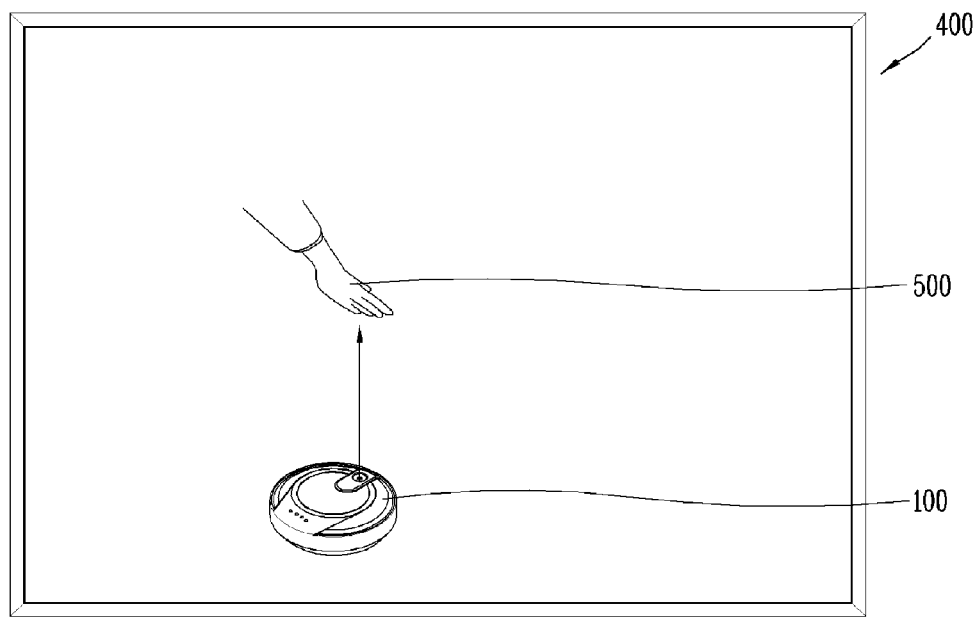
[Fig. 10b]
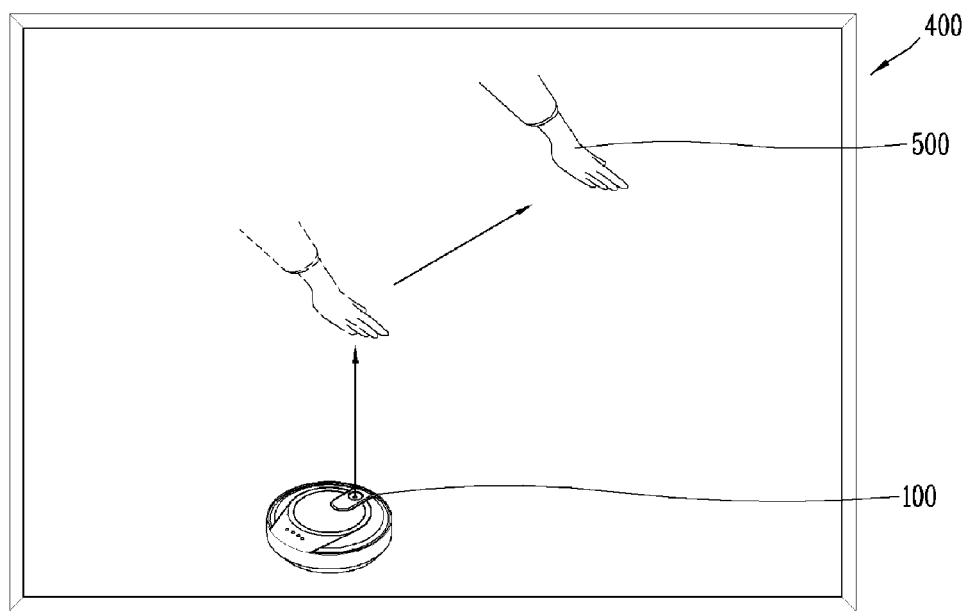

[Fig. 10c]
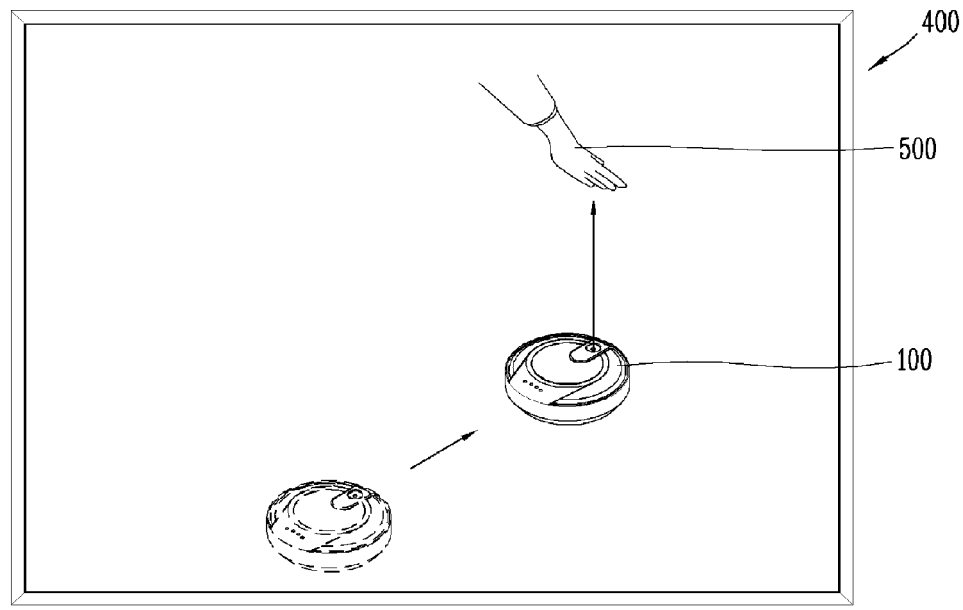
[Fig. 11a]
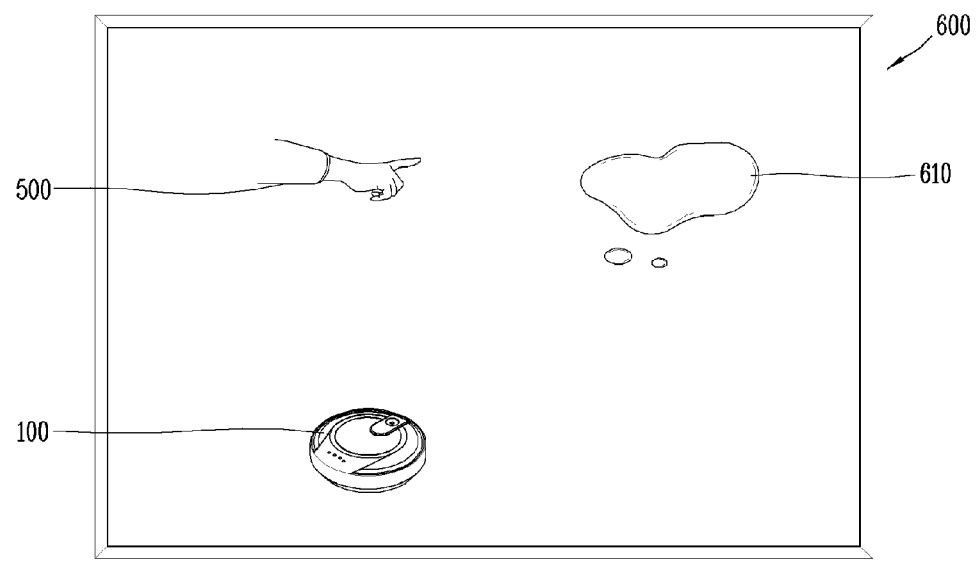

[Fig. 11b]
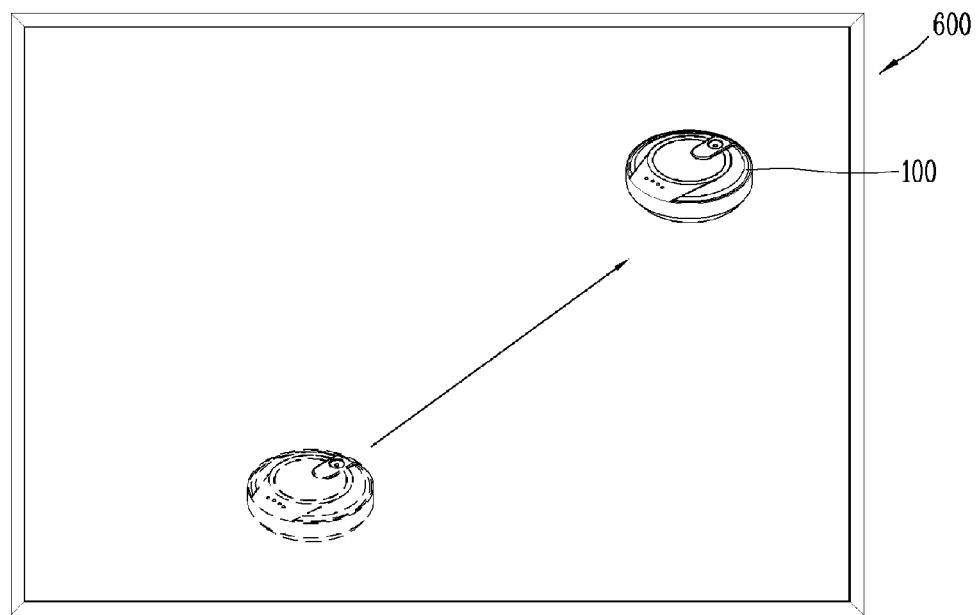
[Fig. 12a]
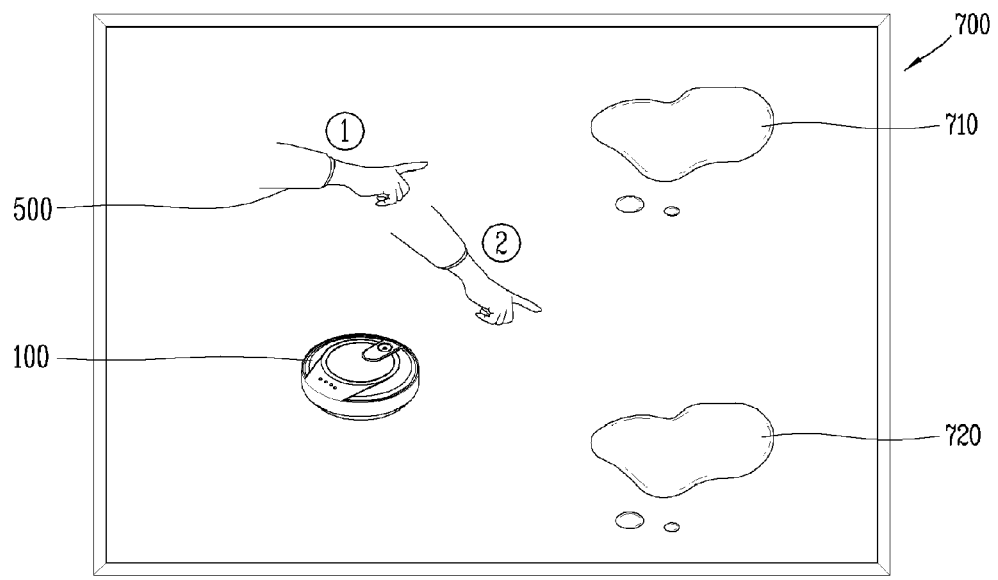

[Fig. 12b]
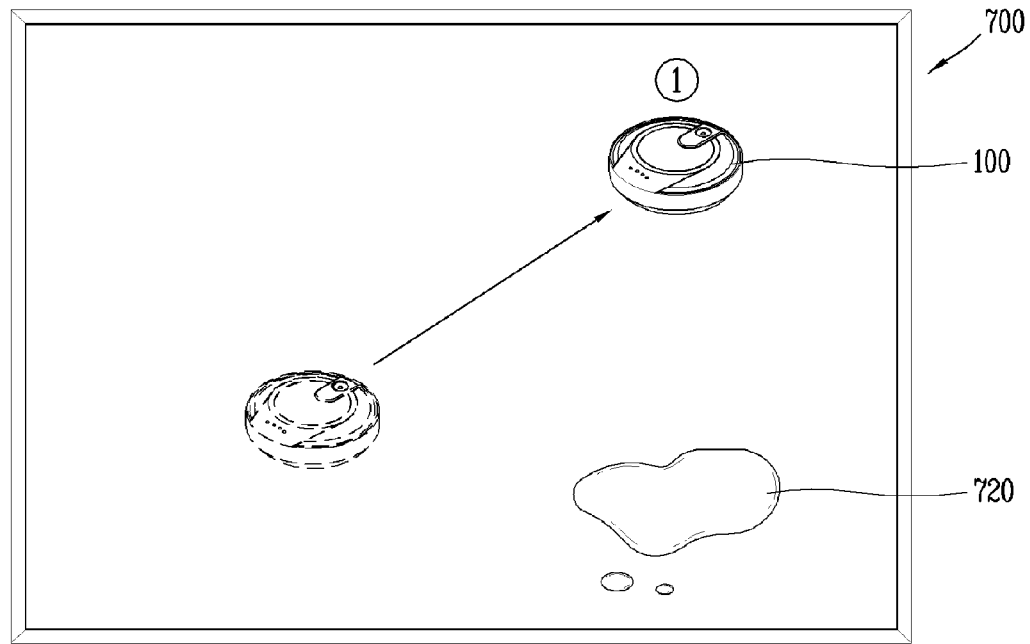
[Fig. 12c]
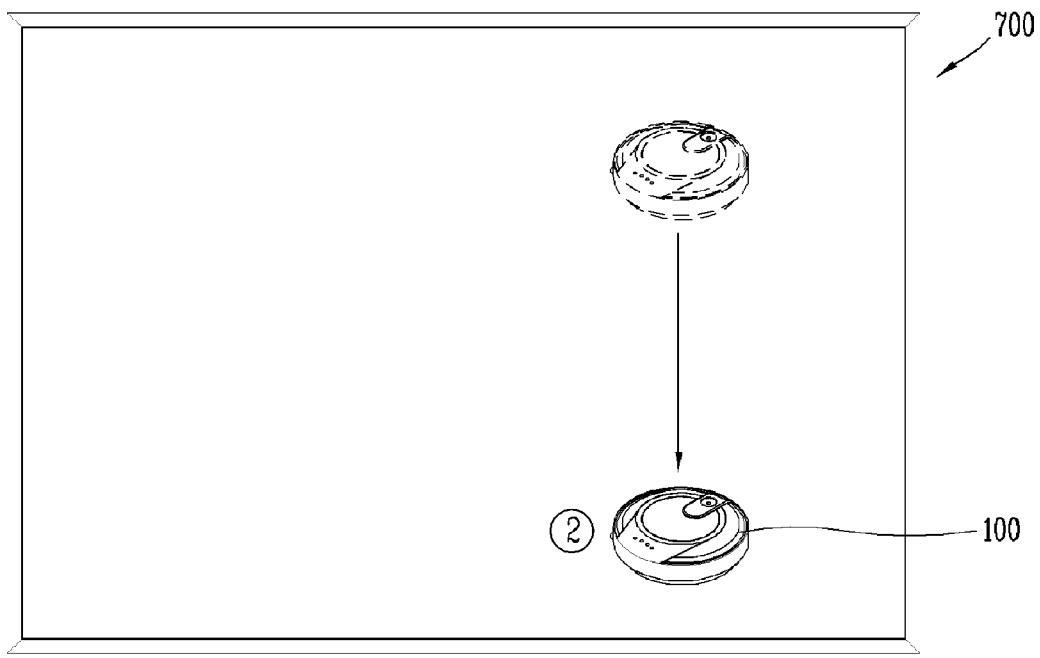

[Fig. 13]
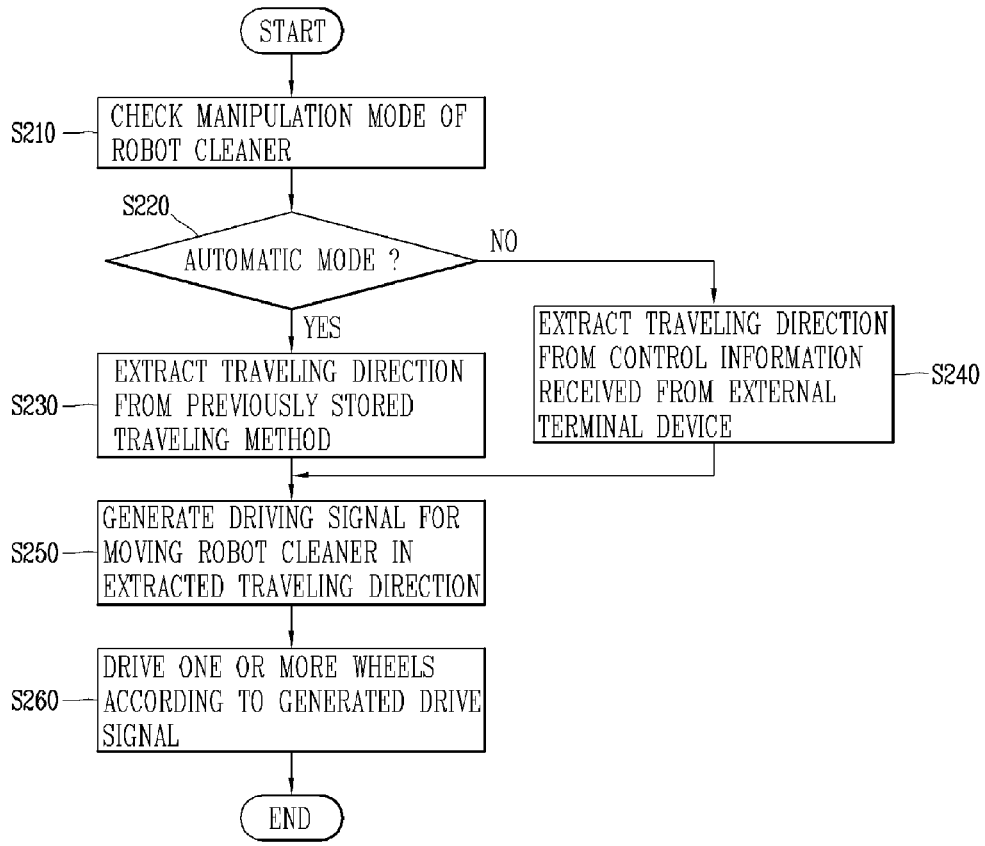
[Fig. 14a]
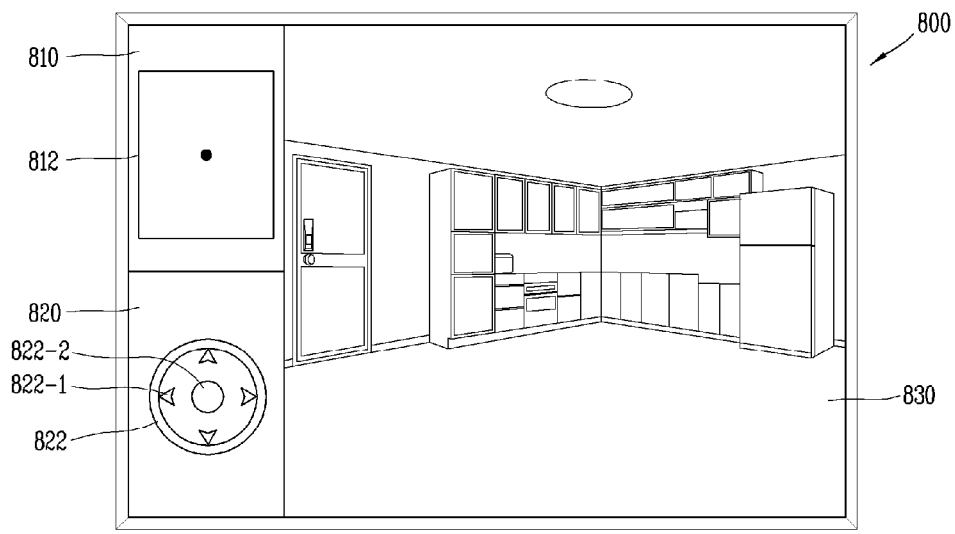

[Fig. 14b]
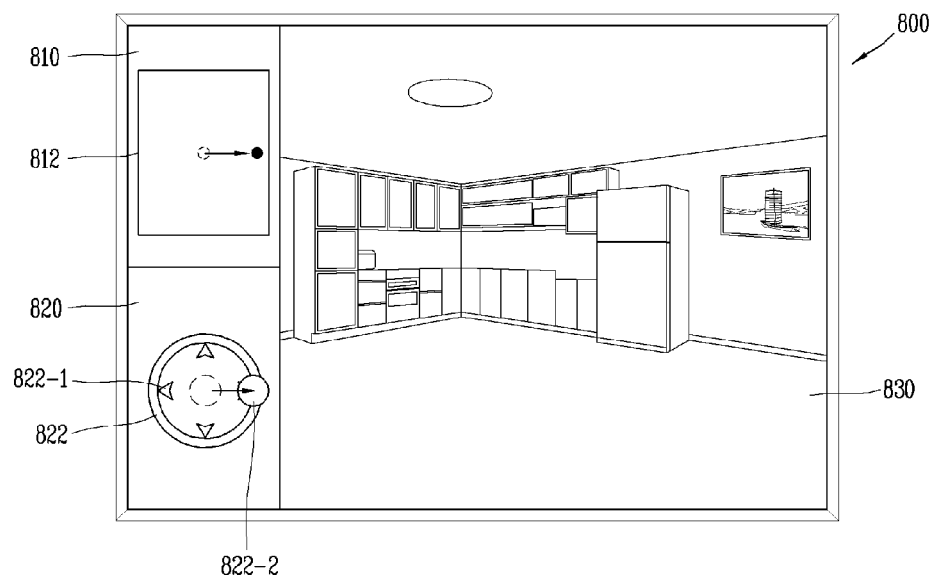
[Fig. 14c]
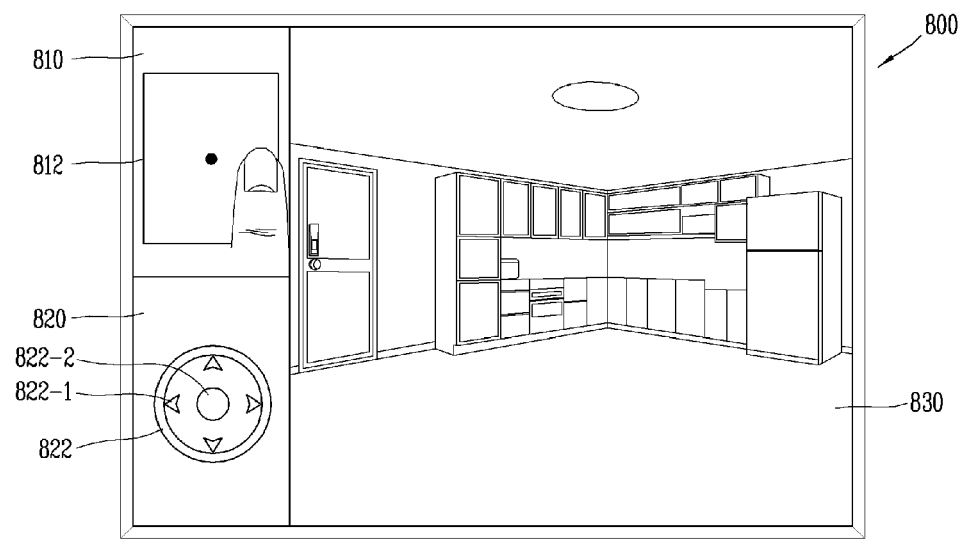

[Fig. 14d]
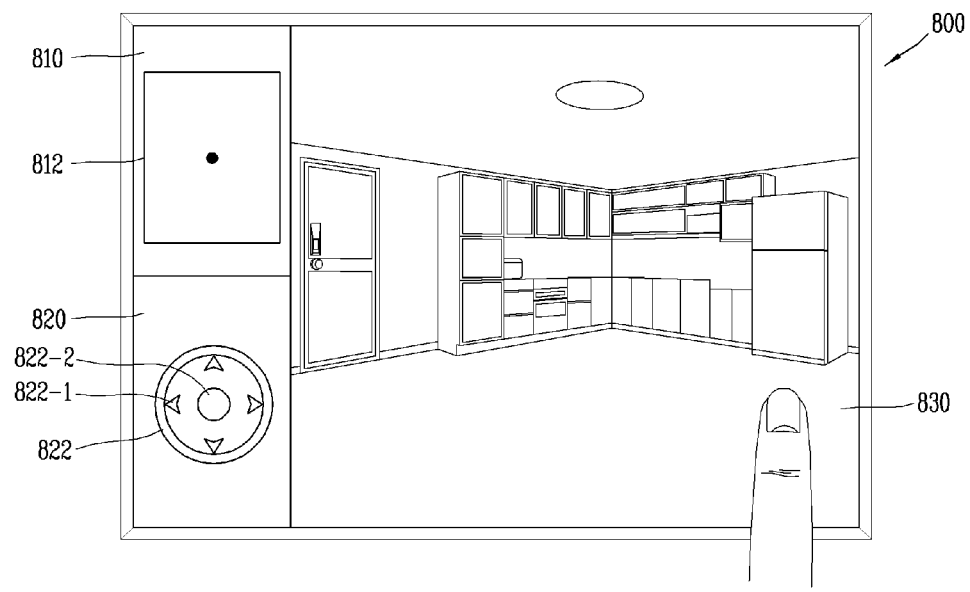
[Fig. 15a]
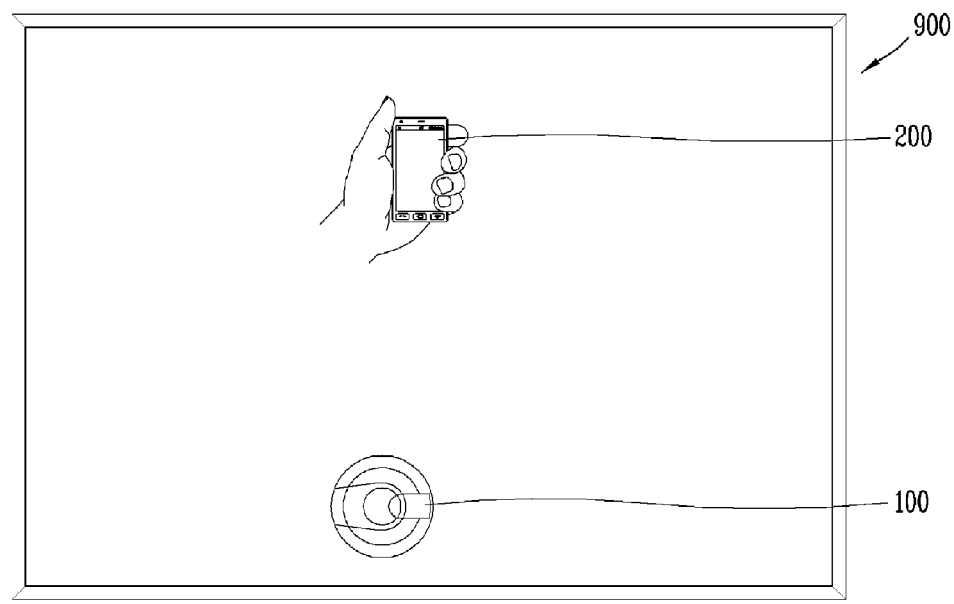

[Fig. 15b]
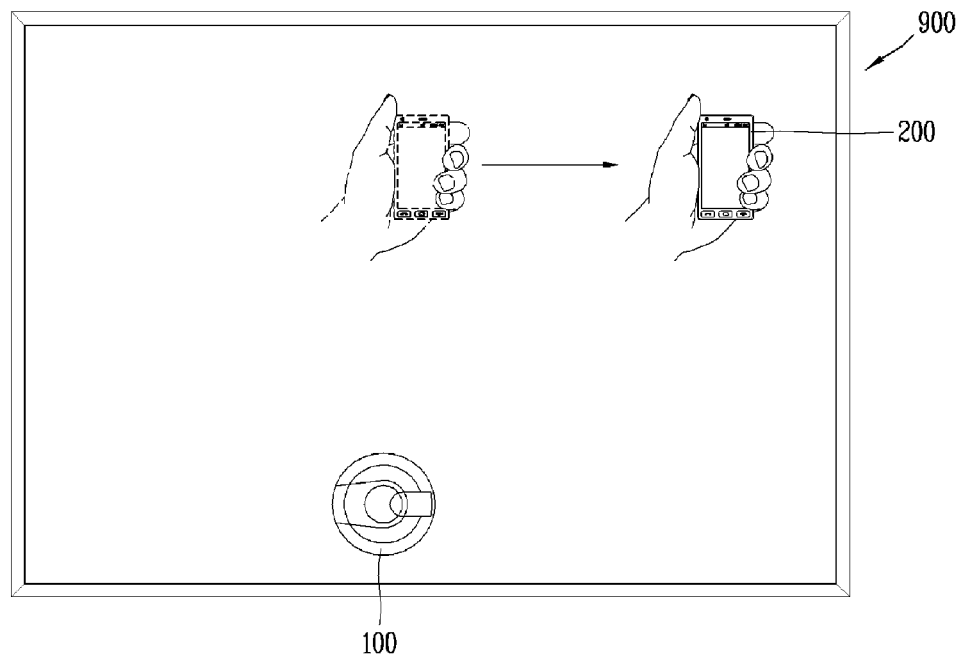
[Fig. 15c]
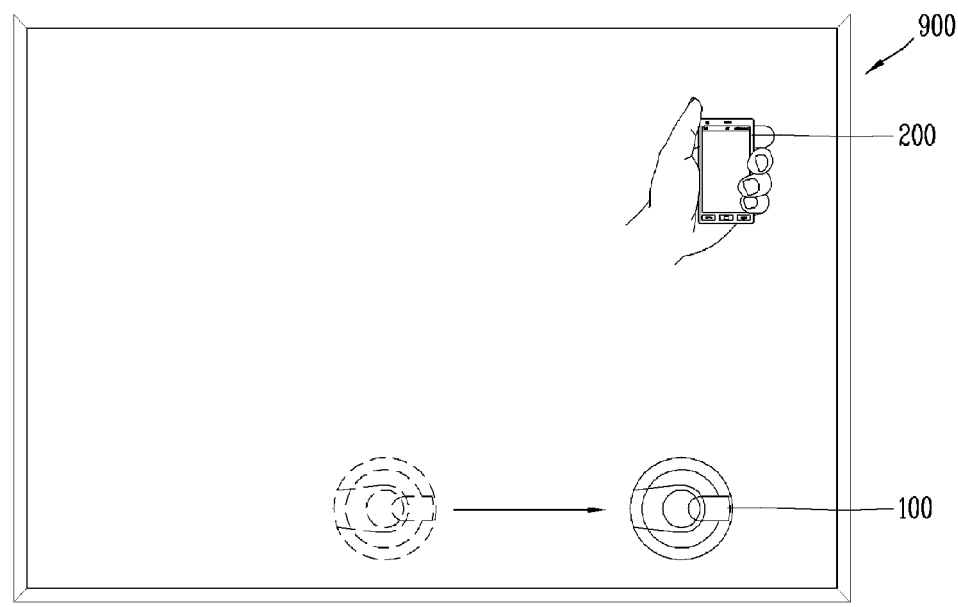

[Fig. 16a]
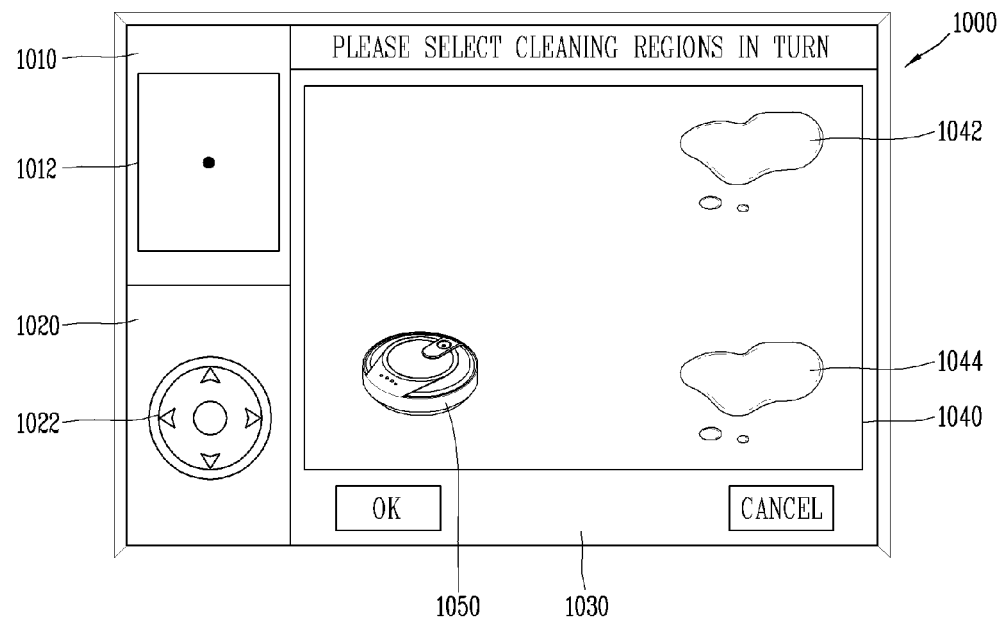
[Fig. 16b]
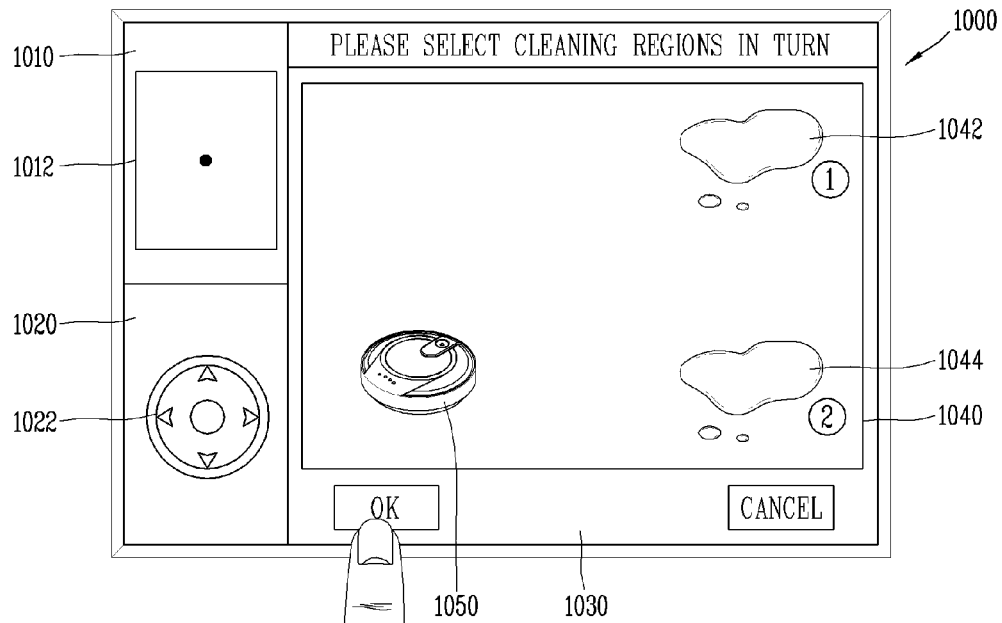

[Fig. 16c]
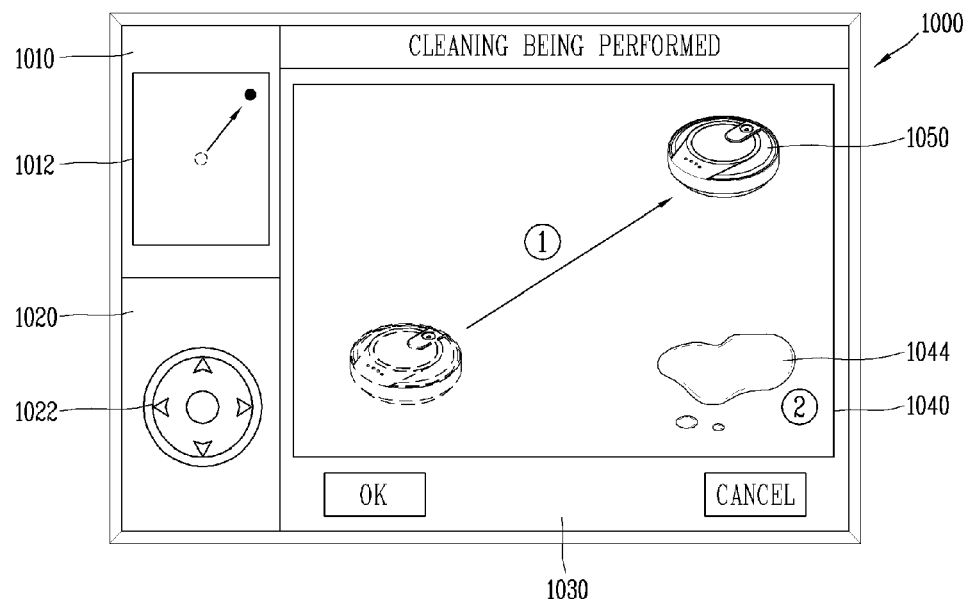
[Fig. 16d]
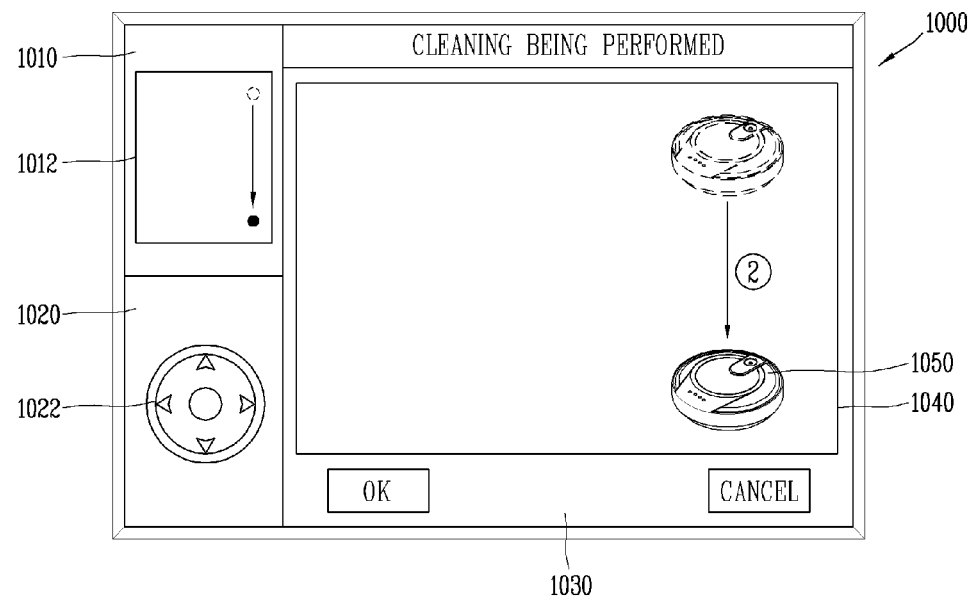

[Fig. 17]
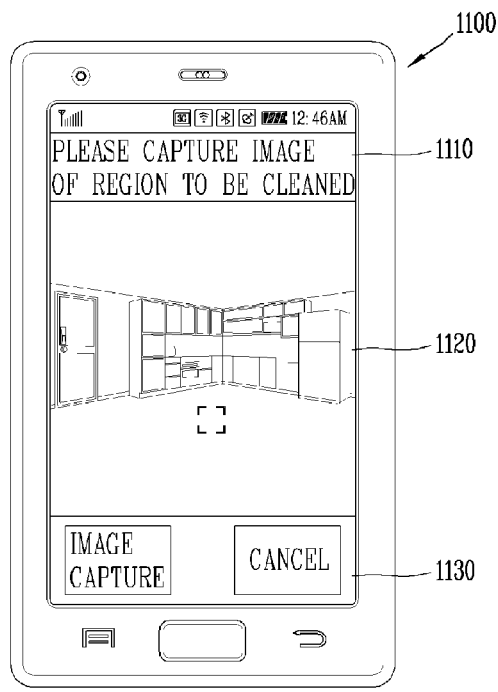
[Fig. 18a]
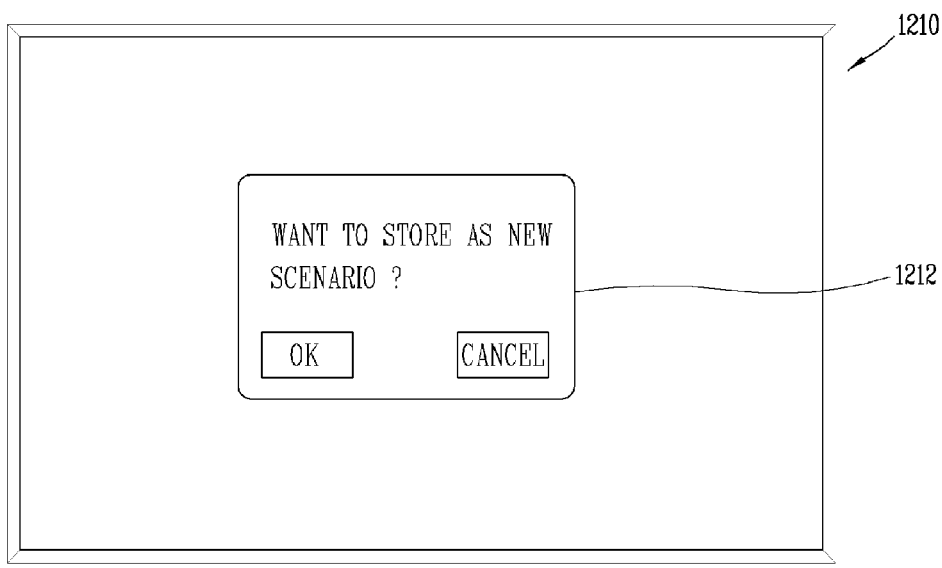

[Fig. 18b]
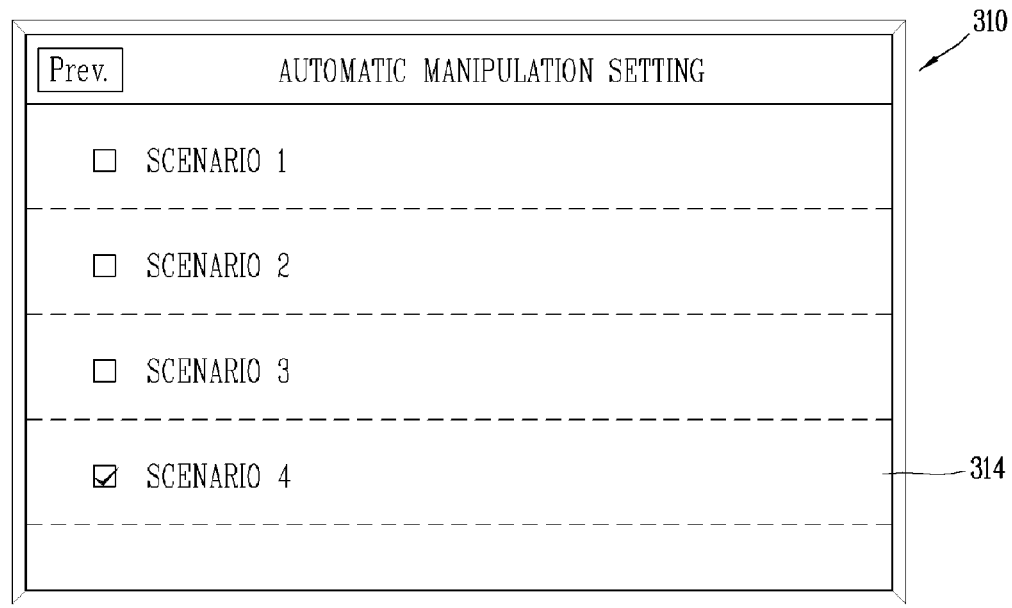

AUTOMATIC MOVING APPARATUS AND MANUAL OPERATION METHOD THEREOF

TECHNICAL FIELD

The present invention relates to a manually operable automatic moving apparatus and a manual operation method thereof.

BACKGROUND ART

In general, robots have been developed for industrial purposes to play a role in factory automation. Recently, application fields of robots have extended, Robots for medical purpose, space navigation robots, and the like, and even home robots that may be used in general houses have been developed.

A typical example of home robots is a robot cleaner, a type of an electronic device that sucks dust or foreign materials therearound while traveling in a certain region. The robot cleaner generally includes a rechargeable battery and an obstacle sensor for avoiding a hindrance or an obstacle during traveling, whereby the robot cleaner can perform cleaning while traveling.

DISCLOSURE OF INVENTION

Technical Problem

Therefore, an aspect of the present invention provides various interfaces allowing users to directly manipulate an automatic moving apparatus manually, thereby enhancing user convenience and efficiency.

Solution to Problem

According to an aspect of the present invention, there is provided an automatic moving apparatus including: a storage unit configured to store a traveling method; an image detection unit configured to acquire a captured image; a driving unit having one or more wheels and driving the wheels according to a driving signal; and a control unit configured to extract a traveling direction from the traveling method stored in the storage unit in a first mode, extract a traveling direction indicated by a sensing target from the captured image acquired by the image detection unit in a second mode, and generate a driving signal for moving the automatic moving apparatus in the extracted traveling direction.

According to another aspect of the present invention, there is provided an automatic moving apparatus including: a storage unit configured to store a traveling method; a communication unit configured to receive control information from an external terminal device; a driving unit having one or more wheels and driving the wheels according to a driving signal; and a control unit configured to extract a traveling direction from the traveling method stored in the storage unit in a first mode, extract a traveling direction from the control information received by the communication unit in a second mode, and generate a driving signal for moving the automatic moving apparatus in the extracted traveling direction.

According to embodiments of the present invention, the user can manually manipulate the automatic moving apparatus through simple manipulation. Accordingly, a cleaning effect can be maximized, and in particular, both convenience and utility of the automatic moving apparatus can be obtained by providing an automatic manipulation mode and a manual manipulation mode.

Advantageous Effects of Invention

According to the embodiments of the present invention, the user can simply manipulate an automatic moving apparatus manually. Accordingly, cleaning effect is maximized when the automatic moving apparatus is a robot cleaner. Specially, the automatic moving apparatus provides both an auto manipulation mode and a manual manipulation, thereby enhancing user convenience and efficiency.

BRIEF DESCRIPTION OF DRAWINGS

FIG. 1 is a block diagram of a manual control system of a robot cleaner according to an embodiment of the present invention.

FIG. 2 is a perspective view showing an external appearance of the robot cleaner 100 according to an embodiment of the present invention.

FIG. 3 is a schematic block diagram of the robot cleaner 100 according to an embodiment of the present invention.

FIG. 4 is a detailed block diagram of the robot cleaner 100 according to an embodiment of the present invention.

FIG. 5 is a side view showing an external appearance of the robot cleaner 100 according to an embodiment of the present invention.

FIG. 6 is a view showing a lower portion of the external appearance of the robot cleaner 100 according to an embodiment of the present invention.

FIG. 7 is a block diagram of a terminal device 200 according to an embodiment of the present invention.

FIG. 8 is a flow chart illustrating a process of controlling an operation of the robot cleaner according to a first embodiment of the present invention.

FIGS. 9a to 9c are views showing configuration screens of the robot cleaner according to an embodiment of the present invention.

FIGS. 10a to 10c are conceptual views showing a process of driving the robot cleaner in a manual manipulation mode according to the first embodiment of the present invention.

FIGS. 11a and 11b are different conceptual views showing a process of driving the robot cleaner in a manual manipulation mode according to the first embodiment of the present invention.

FIGS. 12a to 12c are different conceptual views showing a process of driving the robot cleaner in a manual manipulation mode according to the first embodiment of the present invention.

FIG. 13 is a flow chart illustrating a process of controlling an operation of the robot cleaner according to a second embodiment of the present invention.

FIGS. 14a to 14d are conceptual views showing a process of driving the robot cleaner in a manual manipulation mode according to the second embodiment of the present invention.

FIGS. 15a to 15c are different conceptual views showing a process of driving the robot cleaner in a manual manipulation mode according to the second embodiment of the present invention.

FIGS. 16a to 16d are different conceptual views showing a process of driving the robot cleaner in a manual manipulation mode according to the second embodiment of the present invention.

FIG. 17 is a different conceptual view showing a process of driving the robot cleaner in a manual manipulation mode according to the second embodiment of the present invention.

FIGS. 18a and 18b are views showing screens of setting a scenario of the robot cleaner according to an embodiment of the present invention.

MODE FOR THE INVENTION

Hereinafter, embodiments will be described in detail with reference to the accompanying drawings such that they can be easily practiced by those skilled in the art to which the present invention pertains. As those skilled in the art would realize, the described embodiments may be modified in various different ways, all without departing from the spirit or scope of the present invention. In order to clarify the present invention, parts irrespective of description will be omitted, and similar drawing sequences are used for the similar parts throughout the specification.

FIG. 1 is a block diagram of a manual control system of a robot cleaner according to an embodiment of the present invention.

With reference to FIG. 1, a system for manually controlling a robot cleaner includes a robot cleaner 100 and terminal devices 200a to 200c. The robot cleaner 100 may extract a control command from a control signal to perform the control command, and capture an image of surroundings according to the control command to generate image information. The terminal devices 200a to 200c may be connected to the robot cleaner 100, and receive the image information from the robot cleaner 100 and store the received image information.

The terminal devices 200a to 200c are classified into a mobile or portable terminal and a stationary terminal according to whether the terminal devices are movable. Here, the terminal devices 200a to 200c include both a mobile or portable terminal and a stationary terminal. Also, the terminal devices 200a to 200c are classified into a handheld terminal and a vehicle mount terminal, and here the terminal devices 200a to 200c include both a handheld terminal and a vehicle mount terminal. For example, the terminal devices may include cell phones (PCS phones), smart phones, laptop computer, digital broadcast terminals, PDAs (Personal Digital Assistants), PMPs (Portable Multimedia Player), navigation devices, and the like. A networking scheme of the manual control system may differ according to types of terminal devices. For example, in case of a mobile phone or a smart phone, the manual control system may use a mobile communication network such as 3G, CDMA, WCDMA, or the like, and the robot cleaner and the terminal device transmits and receives radio signals to and from a base station, an external terminal, a server, or the like.

With reference to FIGS. 2 and 3, the robot cleaner 100 according to an embodiment of the present invention includes a communication unit 110 and a control unit 120. Also, the robot cleaner 100 may further include an image detection unit 131, an obstacle detection unit 132, and a location recognition unit 133. The communication unit 110 receives a control signal from an external terminal device and transmits a response signal with respect to the control signal or one or more data. The control unit 120 controls the robot cleaner according to the control signal and generates the response signal according to the control results. The control unit 120 extracts a cleaning start command or a cleaning stop command from the control signal, and performs cleaning according to the cleaning start command or stops cleaning according to the cleaning stop command.

The communication unit 110 is connected to the terminal device according to one of satellite communication schemes, namely, according to one communication scheme among currently available communication schemes to transmit and receive data to and from the terminal device. The communication unit 110 transmits status information, obstacle information, location information, image information, a cleaning map, or the like, of the robot cleaner 100. Also, the communication unit 110 may perform communication with the terminal device according to one communication scheme among short-range wireless communication schemes such as infrared data association (IrDA), wireless location area network (WLAN), Zigbee™, and the like. For example, when the terminal device is a smart phone, the robot cleaner may include a communication unit according to a communication scheme available for the smart phone. Also, the communication unit 110 may receive cleaning reservation information of the robot cleaner 100 from the terminal device 200. Here, the control unit 120 performs cleaning by using the cleaning reservation information.

With reference to FIGS. 2 and 3, the robot cleaner 100 may further include the image detection unit 131 installed to face upwardly or forwardly and having an upper camera sensor to capture an image of the surroundings of the robot cleaner to detect image information. When the image detection unit 131 includes a plurality of upper camera sensors, the camera sensors may be formed on an upper portion or a side portion of the robot cleaner 100 at certain distance or at certain angle. The image detection unit 131 may also be used as a different type of a location recognition unit. The image detection unit 131 may further include a lens connected to the camera and focusing an object, an adjusting unit adjusting the camera, and a lens adjusting unit for adjusting the lens. As the lens, a lens having a wide angle of view to capture every surrounding region, e.g., every region of the ceiling, is used. The control unit 120 may extract a feature point from the image information captured by the image detection unit, recognize a location of the robot cleaner by using the feature point, and generate a cleaning map with respect to a cleaning area.

With reference to FIGS. 3 and 4, the robot cleaner according to an embodiment of the present invention further includes the obstacle detection unit 132 including one or more sensors, detecting an obstacle around the robot cleaner by using sensing signals of the sensors, and outputting obstacle information. Here, the control unit 120 generates a cleaning map by using the obstacle information.

The obstacle detection unit 132 may include first sensors 132a installed at certain intervals on a front side of the robot cleaner 100, namely, on an outer circumferential surface of the robot cleaner 100, as shown in FIG. 2 or 5. Also, the obstacle detection unit 132 may include a second sensor 132b installed to have a face protruded to an outer side of a main body. The positions and types of the first and second sensors may vary according to types of the robot cleaner, and the obstacle detection unit may further include a variety of sensors. The first sensor 132a senses an object, in particular, an obstacle, present in a direction in which the robot cleaner travels, and transfers the sensing information to the control unit 120. Namely, the first sensor senses a protrusion, household goods, furniture, a wall face, a wall corner, and the like, existing in a path along which the robot cleaner moves, and transfers corresponding information to the control unit 120. The first sensor may be an infrared ray sensor, an ultrasonic sensor, an RF sensor, a geomagnetic sensor, or the like. The second sensor 132b may sense an obstacle present at a front side or a lateral side and transfers obstacle information to the control unit 120. Namely, the second sensor 132b senses a protrusion, household goods, furniture, a wall face, a wall corner, and the like, existing in a path along which the robot cleaner moves, and transfers corresponding information to the control unit 120. The second sensor 132b may be an infrared ray sensor, an ultrasonic sensor, an RF sensor, a position sensitive device (PSD) sensor, or the like.

As shown in FIG. 6, the obstacle detection unit 132 may further include a precipice sensor 132c installed on a lower surface of the main body and sensing an obstacle on a bottom surface, e.g., a precipice. The precipice sensor 132c may be configured to stably obtain a measurement value regardless of a reflectivity of the bottom surface, a color difference, or the like, and may be configured to have a type of an infrared module such as a PSD sensor.

Also, the obstacle detection unit 132 may further include a charge signal sensor (not shown) receiving a guidance signal transmitted from a charging station. The robot cleaner 100 may check a location and direction of the charging station upon receiving the guidance signal generated by the charging station. The charging station transmits a guidance signal indicating a direction and distance to allow the robot cleaner 100 to be returned. Upon receiving the signal transmitted from the charging station, the robot cleaner 100 determines a current location thereof and sets a movement direction to return to the charging station. A charging signal sensor may be, for example, an infrared ray sensor, an ultrasonic sensor, an RF sensor, or the like. In general, the infrared ray sensor is used. The charging signal sensor may be provided within the robot cleaner 100 or at an outer side of the robot cleaner 100. For example, the charging signal sensor may be installed at a lower portion of the output unit 180 or in the vicinity of the image detection unit 131.

The output unit 180 may display a remaining battery capacity on a screen. Also, the terminal device 200 may receive a charged state of the battery, a remaining battery capacity, or the like, from the robot cleaner 100 and display the same at one side of the screen of a display unit.

With reference to FIGS. 3 and 4, the robot cleaner according to an embodiment of the present invention may further include the location recognition unit 133 having one or more sensors, recognizing a location of the robot cleaner by using sensing signals of the sensors and outputting location information. Here, the control unit 120 may correct a cleaning map by using the location information recognized by the location recognition unit 133.

As shown in FIG. 6, the location recognition unit 133 includes a lower camera sensor 133a provided on a rear side of the robot cleaner and capturing an image of a lower side, namely, the bottom surface, a cleaning target face. The lower camera sensor 133a may be an optical flow sensor, which converts an image of a lower portion input from an image sensor provided in the sensor to generate image data having a certain format. The lower camera sensor may sense a location of the robot cleaner 100 irrespective of sliding of the robot cleaner 100. The control unit 120 compares and analyzes image data captured by the lower camera sensor according to time to calculate a movement distance and movement direction to thus calculate a location of the robot cleaner 100. Since the lower side of the robot cleaner 100 is observed by using the lower camera sensor, the control unit can make a reliable correction resistant to sliding with respect to the location calculated by a different unit.

The location recognition unit 133 may further include an acceleration sensor sensing a change in the speed of the robot cleaner 100, e.g., a change in a movement speed according to start, stop, a change of direction, collision with an object, or the like. The acceleration sensor may be attached to a position adjacent to a main wheel or an auxiliary wheel to sense sliding or idle rotation of the wheel. Here, the speed is calculated by using acceleration sensed by the acceleration sensor, and compared with a reference speed to thus check or correct the location of the robot cleaner 100. However, in general, the acceleration sensor is installed in the control unit 120 to sense a change in speed of the robot cleaner when the robot cleaner performs cleaning operation or makes a movement. Namely, the acceleration sensor senses impulse according to the change in speed to output a corresponding voltage value. Thus, the acceleration sensor may perform a function of an electronic bumper.

The location recognition unit 133 may further include a gyro sensor sensing a rotation direction of the robot cleaner and sensing a rotation angle when the robot cleaner moves or performs cleaning. The gyro sensor may sense an angular velocity of the robot cleaner and output a voltage value proportional to the angular velocity. The control unit 120 calculates a rotation direction and rotation angle by using the voltage value output from the gyro sensor.

With reference to FIG. 4, the location recognition unit 133 may further include a wheel sensor 162 connected to the left and right main wheels 161 to sense the number of rotations of the main wheels. The wheel sensor 162 mainly uses a rotary encoder, and when the robot cleaner 100 performs cleaning or moves, the wheel sensor 162 senses the number of rotations of the left and right main wheels and outputs the same. The control unit 120 may calculate the rotation speed of the left and right wheels by using the number of rotations.

The control unit 120 may precisely recognize a location of the robot cleaner 100 by using the sensing information from the acceleration sensor, the gyro sensor, the wheel sensor 162, the lower camera sensor and the image information from the image detection unit. Also, the control unit 120 may precisely generate a cleaning map by using the obstacle information detected by the obstacle detection unit and the location recognized by the image detection unit. The communication unit 110 transmits data including the image information, the obstacle information, the location information, the cleaning map, the cleaning area, and the like, to the terminal device 200.

With reference to FIG. 3 or 4, the robot cleaner 100 may further include a storage unit 140 storing one or more information among the image information, the obstacle information, the location information, the cleaning map, and the cleaning area. The storage unit 140 stores a control program for controlling (or driving) the robot cleaner 100 and corresponding data. Also, the storage unit 140 may store a cleaning method or a traveling method. As the storage unit 140, a non-volatile memory is commonly used. Here, the non-volatile memory (NVM) (or NVRAM) is a storage device that maintains stored information although power is not supplied thereto. The non-volatile memory includes a ROM, a flash memory, a magnetic computer storage device (e.g., a hard disk, a diskette drive, or a magnetic tape), an optical disk drive, a magnetic RAM, PRAM, and the like.

With reference to FIGS. 3 and 4, the robot cleaner 100 may further include a cleaning unit 150. The cleaning unit 150 may include a dust container storing collected dust, a suction fan providing power for sucking dust from a cleaning area, and a suction motor rotating the suction fan to suck air, and suck dust or a foreign object around the robot cleaner. With reference to FIG. 6, the cleaning unit 150 may further include a rotary brush 151 rotatably mounted at a lower portion of the main body of the robot cleaner and a side brush 152 cleaning a corner, or the like, of the cleaning area such as a wall face, or the like, while rotating about a vertical shaft of the main body of the robot cleaner 100 (by being centered thereon). The rotary brush 151, rotating about a horizontal shaft of the main body of the robot cleaner 100, floats dust of the bottom (or floor), carpet, or the like, in the air. A plurality of blades are provided in a spiral direction on an outer circumferential surface of the rotary brush 151. A brush may be provided between the spiral blades.

With reference to FIG. 6, the robot cleaner includes left and right main wheels 161 formed at both sides of a lower portion thereof to allow the robot cleaner to move. A handle may be installed on both sides of the main wheels to allow the user to easily grasp. With reference to FIG. 3 or 4, the robot cleaner may further include the driving unit 160 connected to the left and right main wheels 161 so as to be driven. The driving unit 160 may include certain wheel motors for rotating the wheels. By driving the wheel motors, the driving unit 160 moves the robot cleaner 100. The wheel motors are connected to the main wheels to rotate the main wheels, respectively. The wheel motors mutually independently operate and can be rotatable in both directions. Also, the robot cleaner 100 includes one or more auxiliary wheels on a rear surface thereof to support the main body of the robot cleaner 100, minimize frictional contact between the lower surface of the main body and the bottom surface (i.e., the surface to be cleaned), and allow the robot cleaner 100 to smoothly move.

With reference to FIGS. 3 and 4, the robot cleaner 100 may further include an input unit 170 directly receiving a control command. Also, the user, and so on, may input a command for outputting one or more information items among the information items stored in the storage unit 140. The input unit 170 may be configured as one or more buttons. For example, the input unit 170 may include an OK button, a setting button, or the like. The OK button inputs a command for conforming obstacle information, location information, image information, cleaning area, or a cleaning map. The setting button inputs a command for setting the foregoing information items. The input unit 170 may include a resetting button for inputting a command for resetting the information items, a delete button, a cleaning start button, a stop button, or the like. In another example, the input unit 170 may include a button for setting or deleting reservation information. Also, the input unit 170 may further include a button for setting or changing a cleaning mode. Also, the input unit 170 may further include a button for receiving a command for returning to the charging station. As shown in FIG. 2, the input unit 170 may be installed as a hard key, a soft key, a touch pad, or the like, at an upper portion of the robot cleaner. Also, the input unit 170 may have a form of a touch screen along with the output unit 180.

As shown in FIG. 2, the output unit 180 may be provided on the upper portion of the robot cleaner 100. Of course, the installation position or the installation form of the output unit 180 may vary. For example, the output unit 180 may display reservation information, a battery state, a cleaning method or a traveling method such as intensive cleaning, a space extension, a zigzag operation, or the like, on the screen thereof. The output unit 180 may output a current state of the respective units constituting the robot cleaner, and a current cleaning state. Also, the output unit 180 may display obstacle information, location information, image information, an internal map, a cleaning area, a cleaning map, or the like, on the screen. The output unit 180 may be configured as any one of elements among a light emitting diode (LED), a liquid crystal display (LCD), a plasma display panel (PDP), and an organic light emitting diode (OLED).

With reference to FIG. 4, the robot cleaner may further include a power source unit 190. The power source unit 190 may include a rechargeable battery to provide power to the robot cleaner 100. The power source unit supplies driving power to the respective units and operation power for the robot cleaner 100 to move or perform cleaning. When a remaining power capacity is insufficient, the robot cleaner moves to the charging station and charged upon receiving a charge current. The robot cleaner further includes a battery sensing unit (not shown) sensing charge state of the battery and transmitting sensing results to the control unit 120. The battery 191 is connected to the battery sensing unit, and a remaining battery capacity and charge state of the battery are transferred to the control unit 120. The remaining battery capacity may be displayed on the screen of the output unit. As shown in FIG. 6, the battery 191 may be positioned at the center of the lower portion of the robot cleaner, or may be positioned at one of left and right portions of the robot cleaner so that the dust container can be placed at the central portion of the lower portion of the main body. In the latter case, the robot cleaner 100 may further include a counter weight to resolve weight concentration of the battery.

The control unit 120 may previously set a reference value (remaining battery capacity) and compares the remaining battery capacity with the reference value. Upon comparison, when the sensing result is the reference value or smaller, the control unit 120 moves the robot cleaner 100 to the charging station to charge the robot cleaner 100. For example, the control unit 120 may stop a current operation of the robot cleaner 100 and move the robot cleaner 100 to the charging station to allow the robot cleaner 100 to be charged, according to a charge command from the terminal device 200. In another example, the control unit 120 may extract a charge command, and may perform a charge command according to a comparison result obtained by comparing the remaining battery capacity with the reference value or may perform a previous operation.

With reference to FIG. 7, the terminal device 200 according to an embodiment of the present invention may include a wireless communication unit 210, a controller 220, and a display unit 230.

The wireless communication unit 210 transmits a control signal generated by the controller 220 to the robot cleaner 100 and receives one or more data items including image information or a cleaning map from the robot cleaner 100. Here, the one or more data items refers to image information, obstacle information, location information, a cleaning map, state information, and the like. The controller 220 generates a control signal and generates a control screen by using the data. Here, the control command includes a cleaning start command or a cleaning stop command. The wireless communication unit 210 may include one or more modules allowing for wireless communication in a network between the terminal device 200 and a wireless communication system, between terminal devices, or between a terminal device and the robot cleaner 100. For example, the wireless communication unit 210 may include a broadcast receiving module, a mobile communication module, a wireless Internet module, a short-range communication module, a location information module, and the like.

The broadcast receiving module receives broadcast signals and/or broadcast associated information from an external broadcast management server through a broadcast channel. The mobile communication module transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception. The wireless Internet module, which refers to a module supporting wireless Internet access, may be built-in or externally installed to the terminal device. Here, as a wireless Internet technique, a WLAN (Wireless LAN), Wi-Fi, Wibro (Wireless Broadband), Wimax (World Interoperability for Microwave Access), HSDPA (High Speed Downlink Packet Access), and the like, may be used. The short-range communication module is a module supporting short-range communication. Here, as a short-range communication technology, Bluetooth, Radio Frequency IDentification (RFID), Infrared Data Association (IrDA), Ultra WideBand (UWB), ZigBee™, and the like, may be used.

The display unit 230 includes a touch recognition region 231 for receiving a control command, and displays a control screen. Also, the display unit 230 may display an icon according to a communication scheme (e.g., Wi-Fi, 3G), displays communication sensitivity, and a remaining battery capacity of the robot cleaner. As shown in FIG. 9a, the display unit 230 may display a touch recognition region including a first region 232 including the control screen, receiving the control command, and having a certain size, and a second region 233 having a size smaller than or equal to the first region 232. Of course, in case of a mobile phone or a notebook, or the like, which does not have a touch screen (or touch pad), a touch recognition region may not be formed, and, instead, an input unit for receiving a control command and an output unit displaying a control screen may be discriminated.

The display unit 230 may alternately display a cleaning start icon receiving a cleaning start command and a cleaning stop icon receiving a cleaning stop command on the touch recognition region. Also, the display unit 230 may further include a mode icon for setting a cleaning mode. Here, when a touch input with respect to the mode icon is received, the controller 220 may generate a mode setting screen and the display unit 230 may display a mode setting screen. Also, the display unit 230 may further include a cleaning reservation icon for setting a cleaning reservation. Here, when a touch input with respect to the cleaning reservation icon is received, the controller 220 may generate a cleaning reservation screen and the display unit displays the cleaning reservation screen.

The display unit 230 may display information processed in the terminal device 200. Namely, the display unit 230 displays a control screen. For example, when the terminal device 200 is in a phone call mode, the display unit 230 may display a User Interface (UI) or a Graphic User Interface (GUI) associated with a call. The display unit 230 may include at least one of a Liquid Crystal Display (LCD), a Thin Film Transistor-LCD (TFT-LCD), an Organic Light Emitting Diode (OLED) display, a flexible display, and a three-dimensional (3D) display.

When the display unit 230 and a touch sensor for sensing a touch operation are overlaid in a layered manner, the display unit 230 may be used as both an input-available touch screen and an output-available touch screen. The touch sensor may have the form of, for example, a touch film, a touch sheet, a touch pad, etc. The touch sensor may be configured to convert a pressure applied to a particular portion of the display unit 230 or a change in capacitance at a particular portion of the display unit 230 into an electrical input signal. The touch sensor may be configured to sense the pressure when a touch is applied, as well as a touched position or area. The touch sensor may be a proximity sensor that a pointer is positioned to be close to the screen without actually being in contact with the screen. The proximity sensor refers to a sensor for sensing the presence or absence of an object that accesses a certain sensing surface or an object that exists nearby by using the force of electromagnetism or infrared rays without a mechanical contact. In an embodiment of the present invention, a touch recognition includes a proximity touch in which the pointer is positioned to be close to the touch screen without being contacted and a contact touch in which the pointer is actually in contact with the touch screen.

With reference to FIG. 7, the terminal device may further include a memory 240. The memory 240 may store a program for operating the controller 220. Also, the memory 240 may store input/output data (e.g., phonebook, messages, still images, videos, and the like). The memory 240 may pattern a control signal for controlling the robot cleaner and a corresponding control command in advance and store the same.

The terminal device may further include an A/V (audio/video) input unit, a user input unit, a sensing unit, an interface unit, a power supply unit, and the like.

The A/V input unit, which is to input an audio signal or a video signal, may include a camera, a microphone, and the like. The user input unit generates input data to control an operation of the terminal device by the user. The user input unit may be configured as a key pad, a dome switch, a touch pad (pressure/capacitance), a jog wheel, a jog switch, and the like. In particular, when the touch pad is overlaid on the display unit 230 in a layered manner, it may form a touch screen. The sensing unit senses a current status of the terminal device such as an opened or closed state of the terminal device, a location of the terminal device, the presence or absence of user contact with the terminal device, the orientation of the terminal device, an acceleration or deceleration movement and direction of the terminal device, etc., and generates commands or signals for controlling the operation of the terminal device.

The interface unit serves as a passage with every external device connected to the terminal device 200. The interface unit may receive data or power from an external device and transfer the received input to elements within the terminal device 200 or may transfer data within the terminal device to an external device. The power supply unit receives external power or internal power and supplies appropriate power required for operating respective elements and components under the control of the controller 220.

The controller 220 typically controls the general operations of the terminal device. For example, in case of a mobile phone or a smart phone, the controller 220 performs controlling and processing associated with voice calls, data communications, video calls, and the like. Also, the controller 220 may perform a pattern recognition processing to recognize a handwriting input or a picture drawing input performed on the touch screen as characters or images, respectively.

The controller 220 may generate a control signal corresponding to a control command with respect to the robot cleaner 100 and generate a control screen by using data and a response signal. Here, the control command includes a movement command, a patrol command, a charge command, a setting change, and the like, in addition to cleaning commands such as cleaning start, cleaning stop, or the like.

FIG. 8 is a flow chart illustrating a process of controlling an operation of the robot cleaner according to a first embodiment of the present invention.

A process for controlling an operation of a robot cleaner according to an embodiment of the present invention may include a step (S110) of checking a manipulation mode of a robot cleaner, a step (S130) of extracting a traveling direction from a traveling method previously stored in the storage unit when the manipulation mode is an automatic mode in step (S120), a step (S140) of extracting a traveling direction indicated by a sensing target from a captured image obtained by the image detection unit 131 when the manipulation mode is a manual mode in step (S120), a step (S150) of generating a driving signal for moving the robot cleaner in the traveling direction extracted in step S130 or the traveling direction extracted in step S140, and a step (S160) of driving one or more wheels provided in the robot cleaner according to the generated driving signal.

FIGS. 9a to 9c are views showing configuration screens of the robot cleaner according to an embodiment of the present invention.

The robot cleaner 100 or the terminal device 200 may provide items for changing the setting of the robot cleaner 100. For example, the robot cleaner 100 or the terminal device 200 may provide an item for setting a manipulation method of the robot cleaner 100.

With reference to FIG. 9a, a manipulation setting screen 300 providing items for setting a manipulation method of the robot cleaner 100 includes an automatic manipulation setting item 301 and a manual manipulation setting item 303. The automatic manipulation setting item 301 and the manual manipulation setting item 303 include a detailed setting item 302 or 304, respectively. The robot cleaner 100 may be automatically or manually manipulated according to an item selected form the manipulation setting screen 300.

When the automatic manipulation setting item 301 is selected, the robot cleaner 100 is manipulated according to a traveling method previously stored in the storage unit 140. However, when the manual manipulation setting item 303 is selected, the robot cleaner 100 may be manipulated by a sensing target detected from a captured image obtained by the image detection unit 131 or manipulated by the terminal device 200 transmitting control information to the communication unit 110.

With reference to FIG. 9b, when the automatic manipulation setting item 301 is selected in FIG. 9a, an automatic manipulation setting screen image 310 is displayed. The automatic manipulation setting screen image 310 provides an interface allowing for selecting one of a plurality of scenarios stored in the storage unit 140. When one scenario 312 is selected, the robot cleaner 100 is manipulated according to the selected scenario 312. Here, the scenario stores a method for performing cleaning by the robot cleaner 100, including content regarding a cleaning time, order, position, method, and the like.

With reference to FIG. 9c, when the manual manipulation setting item 303 is selected in FIG. 9a, a manual manipulation setting screen image 320 is displayed. The manual manipulation setting screen image 320 provides an interface allowing for selecting one of a plurality of scenarios stored in the storage unit 140. When one scenario 322 is selected, the robot cleaner 100 is manipulated according to the selected scenario 322.

FIGS. 10a to 10c are conceptual views showing a process of driving the robot cleaner in a manual manipulation mode according to the first embodiment of the present invention.

According to the first embodiment of the present invention, the storage unit 140 stores a traveling method and the image detection unit 131 obtains a captured image. Also, the driving unit 160 includes one or more wheels 161 and drives the wheels 161 according to a driving signal. Also, the control unit 120 extracts a traveling direction from the traveling method stored in the storage unit in a first mode and extracts a traveling direction indicated by a sensing target from the captured image obtained by the image detection unit. Also, the control unit 120 generates a driving signal for moving the robot cleaner in the extracted traveling direction. Meanwhile, the control unit 120 may also extract a traveling distance, as well as the traveling direction, to generate a driving signal for moving the robot cleaner by the corresponding distance in the corresponding direction.

In the manual manipulation module, the robot cleaner 100 may obtain an image of the sensing target through the image detection unit 131 having the upper camera sensor. Here, the sensing target refers to a moving object. For example, the sensing target may refer to a moving particular subject having feature information such as a hand.

With reference to FIG. 10a, the user may place his hand 500 at a certain distance above the upper part of the robot cleaner 100 when the robot cleaner is within a certain area 400, such as in the user's home. The robot cleaner 100 may capture an image of an upper direction of the robot cleaner 100 in real time to detect the user's hand 500. In the particular area 400, the robot cleaner 100 may generate a driving signal for moving the robot cleaner 100 in an appropriate direction so that the user's hand 500 can be placed at an upper side of a certain position, such as the center of the robot cleaner, all the time.

Namely, with reference to FIG. 10b, the user may move his hand 500 so as to be placed at an upper portion of the right side of the robot cleaner 100. With reference to FIG. 10c, the robot cleaner 100 may generate a driving signal for moving the robot cleaner 100 in a rightward direction such that the detected user's hand 500 may be placed at a central upper side of the robot cleaner. When the driving signal is applied to the driving unit 160, the left and right main wheels 161 are driven, and as a result, the user's hand 500 can be continuously placed at the central upper side of the robot cleaner 100.

Accordingly, the user can simply manipulate the robot cleaner 100 to perform cleaning on a contamination area. In particular, this can be effective when the robot cleaner 100 does not perform cleaning on a particular contamination area, when the robot cleaner 100 intensively perform cleaning, of when the user wants to immediately clean a particular contamination area, in the automatic manipulation mode.

FIGS. 11a and 11b are different conceptual views showing a process of driving the robot cleaner in the manual manipulation mode according to the first embodiment of the present invention.

With reference to FIG. 11a, the user may indicate a contamination area 610 with his hand 500 in the area in which the robot cleaner 100 is able to capture an image in a certain area 600 such as in the user's home. The robot cleaner 100 may capture an image of an upper direction of the robot cleaner 100 in real time to detect the user's hand 500.

With reference to FIG. 11b, the robot cleaner 100 may generate a driving signal for moving the robot cleaner 100 toward the position indicated by the user's hand 500. When the driving signal is applied to the driving unit 160, the left and right main wheels 161 are driven, and as a result, the robot cleaner 100 can move to the position indicated by the user's hand 500.

FIGS. 12a to 12c are different conceptual views showing a process of driving the robot cleaner in the manual manipulation mode according to the first embodiment of the present invention.

According to an embodiment of the present invention, the control unit 120 extracts a series of traveling directions and a series of traveling distances indicated by the sensing target from the captured image, stores the extracted series of traveling directions and the extracted series of traveling distances in the storage unit 140, and generates a series of driving signals for moving the robot cleaner 100 in the stored traveling directions by the traveling distances.

With reference to FIG. 12a, in a particular area 700 such as home, the user may indicate a first contamination area 710 with his hand 500 within the area in which the robot cleaner 100 may capture an image in the particular area 700. And then, the user may indicate a second contamination area 720 with his hand 500 within the area in which the robot cleaner 100 may capture an image. The robot cleaner 100 may capture an image of an upper direction of the robot cleaner 100 in real time to detect the user's hand 500. Also, the robot cleaner 100 may sequentially store the points indicated by the user's hand 500. After the user finishes the behavior of indicating a particular point with his hand 500, the robot cleaner 100 sequentially retrieves the stored points.

With reference to FIG. 12b, first, the robot cleaner 100 generates a driving signal for retrieving the first contamination area 710 and moving the robot cleaner 100 to the first contamination area 710. As the driving signal is applied to the driving unit 160, the left and right main wheels 161 are driven, and as a result, the robot cleaner 100 can move to the first contamination area 710 to perform cleaning.

With reference to FIG. 12c, the robot cleaner 100 generates a driving signal for retrieving the second contamination area 720 and moving the robot cleaner 100 to the second contamination area 720. As the driving signal is applied to the driving unit 160, the left and right main wheels 161 are driven, and as a result, the robot cleaner 100 may move to the second contamination area 720 to perform cleaning.

FIG. 13 is a flow chart illustrating a process of controlling an operation of the robot cleaner according to a second embodiment of the present invention.

A process of controlling an operation of the robot cleaner according to the second embodiment of the present invention includes: a step (S210) of checking a manipulation mode of the robot cleaner, a step (S230) of extracting a traveling direction from a traveling method previously stored in the storage unit 140 when the manipulation is an automatic mode in step (S220), a step (S240) of extracting a traveling direction from control information obtained by the communication unit 110 when the manipulation mode is a manual mode in step (S220), a step (S250) of generating a driving signal for moving the robot cleaner in the traveling direction extracted in step (S230) or the traveling direction extracted in step (S240), and a step (S260) of driving one or more wheels provided in the robot cleaner according to the generated driving signal.

FIGS. 14a to 14d are conceptual views showing a process of driving the robot cleaner in a manual manipulation mode according to the second embodiment of the present invention.

According to the second embodiment of the present invention, the storage unit 140 stores the traveling method and the communication unit 110 receives control information from the terminal device 200. Also, the driving unit 160 includes one or more wheels 161 and drives the wheels 161 according to a driving signal. The control unit 120 extracts a traveling direction from the traveling method stored in the storage unit in a first mode, and extracts a traveling direction from the control information received by the communication unit 110 in a second mode. Also, the control unit 120 generates a driving signal for moving the robot cleaner in the extracted traveling direction. Meanwhile, the control unit 120 may also extract a traveling distance, as well as the traveling direction, to generate a driving signal for moving the robot cleaner by the corresponding distance in the corresponding direction.

For example, a connection may be established between the robot cleaner 100 and the terminal device 200 according to a user's connection request. Accordingly, the robot cleaner 100 may receive control information from the terminal device 200 and may be driven according to the received control information. In other words, the terminal device 200 may manually control the operation of the robot cleaner 100.

The robot cleaner 100 and the terminal device 200 may be connected by using a wireless Internet technology such as WLAN (Wireless LAN) (Wi-Fi), Wibro (Wireless broadband), Wimax (World Interoperability for Microwave Access), HSDPA (High Speed Downlink Packet Access), or the like. Or, the robot cleaner 100 and the terminal device 200 may be connected by using a short-range communication technology such as Bluetooth™, RFID (Radio Frequency Identification), IrDA (infrared Data Association), UWB (Ultra Wideband), ZigBee™, or the like.

The control information transmitted from the terminal device 200 to the robot cleaner 100 may include a traveling method. The traveling method may include a traveling direction and may further include a traveling distance. The control information may explicitly include, for example, a parameter regarding a direction in which the robot cleaner 100 is to travel or parameters regarding a direction and a distance. Or, the control information may implicitly include, for example, a parameter regarding a direction in which the robot cleaner 100 is to travel or parameters regarding the direction and a distance, such as a parameter regarding a direction in which the terminal device 200 moves or parameters regarding the direction and a distance.

With reference to FIG. 14a, when a connection is established between the robot cleaner 100 and the terminal device 200, the terminal device 200 may display a manual control screen image 800. The manual control screen image 800 may include a cleaning map region 810, a manipulation tool region 820, and a captured image region 830.

The cleaning map region 810 may display a cleaning map 812 with respect to a cleaning area generated by the control unit 120 by using image information captured by the image detection unit 131. The cleaning map 812 may additionally indicate a current location of the robot cleaner 100.

The manipulation tool region 820 may display a tool 822 for manipulating traveling of the robot cleaner 100. The tool 822 manipulating traveling of the robot cleaner 100 may include a direction item 822-1 enabling at least two-dimensional movement of the robot cleaner 100 and an indicator item 822-2 indicating a manipulation direction.

The captured image region 830 displays the image information received from the robot cleaner 100. The image information may be image information generated by capturing an image of the surrounding of the robot cleaner 100 through the image detection unit 110 of the robot cleaner 100. For example, the image information may include a captured image of a front side of the robot cleaner 100.

With reference to FIG. 14b, when the user wants to move the robot cleaner 100 in a particular direction, the user may input a command for moving the robot cleaner 100 in the particular direction by using the traveling manipulation tool 822 displayed on the manipulation tool region 820. For example, the user may input a command for moving the robot cleaner 100 in a corresponding direction by dragging the indicator item 822-2 in the particular direction.

With reference to FIG. 14c, when the user wants to move the robot cleaner 100 to a particular location, the user may input a command for moving the robot cleaner 100 to the corresponding location by using the cleaning map 812 displayed on the cleaning map region 810. For example, the user may input a command for moving the robot cleaner 100 to the corresponding location by touching the particular portion of the cleaning map 812.

With reference to FIG. 14d, when the user wants to move the robot cleaner 100 to a particular position viewed in the capture image region 830, the user may input a command for moving the robot cleaner 100 to the corresponding location by using the captured image displayed on the captured image region 830. For example, the user may input a command for moving the robot cleaner 100 to the corresponding location by touching a particular portion of the captured image.

As shown in FIGS. 14b to 14d, when the command for moving the robot cleaner 100 to a particular direction or to a particular location is input, the terminal device 200 may transmit the corresponding command as control information having a format that can be interpreted by the robot cleaner 100. Upon receiving the control information, the robot cleaner 100 extracts a traveling direction, or a traveling direction and a distance from the control information, and generates a driving signal for moving the robot cleaner 100 in the corresponding direction or in the corresponding direction and by the corresponding distance. As the driving signal is applied to the driving unit 160, the left and right main wheels 161 are driven to move the robot cleaner 100 in the corresponding direction, or in the corresponding direction or by the corresponding distance.

FIGS. 15a to 15c are different conceptual views showing a process of driving the robot cleaner in a manual manipulation mode according to the second embodiment of the present invention.

When a connection is established between the robot cleaner 100 and the terminal device 200, the terminal device 200 may transmit information regarding a movement of the terminal device 200 to the robot cleaner 100. To this end, the terminal device 200 may include an acceleration sensor (not shown) and/or a gyro sensor (not shown).

With reference to FIG. 15a, the user may place the terminal device 200 at a certain distance above the upper part of the robot cleaner 100 when the robot cleaner is within a certain area 400, such as in the user's home. The terminal device 200 may detect a movement by using the acceleration sensor and/or gyro sensor installed therein and transmit information regarding the detected movement to the robot cleaner 100. The robot cleaner 100 may analyze the received information regarding the movement and generate a driving signal for moving the robot cleaner 100 by in a direction or in a direction and by a distance corresponding to the movement of the terminal device 200.

Namely, with reference to FIG. 15b, the user may move the terminal device 200 to the right side of the robot cleaner 100 in a particular area 900. With reference to FIG. 15c, the robot cleaner 100 may generate a driving signal for moving the robot cleaner 100 in the rightward direction according to the movement of the terminal device 200. When the driving signal is applied to the driving unit 160, the left and right main wheels 161 are driven, and accordingly, the robot cleaner 100 can move in the rightward direction.

FIGS. 16a to 16d are different conceptual views showing a process of driving the robot cleaner in a manual manipulation mode according to the second embodiment of the present invention.

For example, a connection may be established between the robot cleaner 100 and the terminal device 200 according to a user's connection request. Accordingly, the robot cleaner 100 may receive control information from the terminal device 200 and may be driven according to the received control information. In other words, the terminal device 200 may manually control the operation of the robot cleaner 100.

With reference to FIG. 16a, when the connection is established between the robot cleaner 100 and the terminal device 200, the terminal device 200 may display a manual control screen image 100. The manual control screen image 1000 may include a cleaning map reduction region 1010, a manipulation tool region 1020, and a cleaning map magnification region 1030.

The cleaning map reduction region 1010 displays a reduced cleaning map 1012 with respect to a cleaning region generated by the control unit 120 by using image information captured by the image detection unit 131. The reduced cleaning map 1012 may additionally indicate a current location of the robot cleaner 100.

The manipulation tool region 1020 displays a tool 1022 for manipulating traveling of the robot cleaner 100. The tool 1022 for manipulating traveling of the robot cleaner 100 may include a direction item enabling at least a 2D movement of the robot cleaner 100 and an indicator item indicating a manipulation direction.

The cleaning map magnification region 1030 displays a magnified cleaning map 1040 with respect to the generated cleaning region. The magnified cleaning map 1040 may include at least one contamination regions 1042 and 1044 and include an indicator 1050 reflecting the location of the robot cleaner 100.

With reference to FIG. 16b, the user may sequentially select spots desired to be cleaned on the magnified cleaning map 1040. For example, the user may sequentially touch the first contamination region 1042 and the second contamination region 1044 on the magnified cleaning map 1040. And, the user may terminate the selection of spots by selecting an 'OK' button displayed on the cleaning map magnification region 1030. The terminal device 200 transmits the position information regarding the selected spots to the robot cleaner 100. The robot cleaner 100 analyzes the control information and sequentially stores the spots selected by the user.

With reference to FIG. 16c, the robot cleaner 100 generates a driving signal for calling the first contamination region 1042 and moving the robot cleaner 100 to the first contamination region 1042. When the driving signal is applied to the driving unit 160, the left and right main wheels 161 are driven, and accordingly, the robot cleaner 100 can move to the first contamination region 1042 to perform cleaning.

With reference to FIG. 16d, subsequently, the robot cleaner 100 generates a driving signal for calling a second contamination region 1044 and moving the robot cleaner 100 to the second contamination region 1044. When the driving signal is applied to the driving unit 160, the left and right main wheels 161 are driven, and accordingly, the robot cleaner 100 can move to the second contamination region 1042 to perform cleaning.

Meanwhile, the user may correct the cleaning map generated by the robot cleaner 100 on the cleaning map magnification region 1030. In this case, the terminal device 200 may provide a user interface allowing for a correction of the cleaning map, and when the cleaning map is corrected through the provided user interface, the terminal device 200 may transmit the corrected content to the robot cleaner 100.

FIG. 17 is a different conceptual view showing a process of driving the robot cleaner in a manual manipulation mode according to the second embodiment of the present invention.

Meanwhile, the terminal device 200 may have a camera (not shown). In this case, the terminal device 200 may provide a captured screen image 1100 of a region to be cleaned by the robot cleaner 100. The captured cleaning region screen image 1100 may include a guide region 1110 providing guide information, a preview region 1120 providing a preview of a captured image, and a menu region 1130 displaying a capture menu.

When an image capture button is selected by the user, the terminal device 200 may transmit the captured image to the robot cleaner 100. The robot cleaner 100 compares the captured image with previously captured image information and extract feature information to determine a corresponding position. And, the robot cleaner 100 generates a driving signal for moving the robot cleaner 100 to the corresponding position. When the driving signal is applied to the driving unit 160, the left and right main wheels 161 are driven, and accordingly, the robot cleaner 100 can move to the position captured by the terminal device 200 to perform cleaning.

FIGS. 18a and 18b are views showing screens of setting a scenario of the robot cleaner according to an embodiment of the present invention.

The traveling direction or the traveling direction and the distance are manually determined by the user in the foregoing manual manipulation mode, and the robot cleaner 100 may be driven accordingly. In this case, the traveling direction, or the traveling direction and distance, traveling order, a traveling time, and the like, may be stored as a scenario.

As shown in FIG. 18a, the robot cleaner 100 or the terminal device 200 may provide a menu 1212 for storing the scenario performed in the manual manipulation mode through a cleaning completion screen image 1200. Also, with reference to FIG. 18b, the user may drive the robot cleaner 100 according to a traveling method performed in the manual manipulation mode by selecting a scenario 314 newly added in the automatic manipulation setting screen 310.

In the embodiments of the present invention, the foregoing method can be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. An automatic moving apparatus comprising:
a camera configured to receive an image of surroundings;
a storage unit configured to store a traveling method;
a communication unit configured to receive control information from an external terminal device;
a driving unit having one or more wheels and driving the wheels according to a driving signal; and
a control unit configured to:
extract a first traveling direction and a first traveling distance from the traveling method stored in the storage unit in a first mode,
extract a second traveling direction and a second traveling distance from the control information received by the communication unit in a second mode,
generate a first driving signal for moving the automatic moving apparatus in the extracted first traveling direction and by the extracted first traveling distance in the first mode,
generate a second driving signal for moving the automatic moving apparatus in the extracted second traveling direction and by the extracted second traveling distance in the second mode,
wherein, when the second mode is entered, a screen capable of selecting a target for controlling the automatic moving apparatus in the second mode among a user's hand and the terminal device is displayed on the terminal device,
wherein, when the user's hand is selected through the screen displayed on the terminal device, the control unit is further configured to:
receive the image via the camera to detect the user's hand, and
move the automatic moving apparatus based on the detected the user's hand, and
wherein, when the terminal device is selected through the screen displayed on the terminal device, the control unit is further configured to:
transmit the image received through the camera to the terminal device in the second mode, wherein the image is displayed on the terminal device, and
move the automatic moving apparatus to a specific position which corresponds to a point of a touch input applied to the image displayed on the terminal device.

2. The automatic moving apparatus of claim 1, wherein the control information is information regarding a movement of the terminal device.

3. The automatic moving apparatus of claim 1, wherein the control unit generates a cleaning map, and the communication unit transmits the cleaning map to the terminal device.

4. The automatic moving apparatus of claim 3, wherein the control information includes a series of location information on the cleaning map.

5. The automatic moving apparatus of claim 3, wherein the control information includes image information captured by the terminal device, and the control unit analyzes the image information to detect a location on the cleaning map.

6. The automatic moving apparatus of claim 3, wherein the communication unit receives correction information of the cleaning map and corrects the cleaning map by using the correction information.

7. The automatic moving apparatus of claim 1, wherein the storage unit stores a driving result of the driving unit, as a new traveling method.

8. A method for controlling an operation of an automatic moving apparatus, the method comprising:
- determining a manipulation mode of the automatic moving apparatus;
- extracting a traveling direction and a traveling distance from a traveling method stored in a storage unit when the manipulation mode is a first mode;
- extracting a traveling direction and a traveling distance from control information received from an external terminal device when the manipulation mode is a second mode;
- generating a driving signal for moving the automatic moving apparatus in the extracted traveling direction and by the extracted traveling distance; and
- driving wheels of the automatic moving apparatus according to the generated driving signal,
- wherein, when the second mode is entered, a screen capable of selecting a target for controlling the automatic moving apparatus in the second mode among a user's hand and the terminal device is displayed on the terminal device,
- wherein, when the user's hand is selected through the screen displayed on the terminal device, further comprising:
- receiving an image to detect the user's hand; and
- moving the automatic moving apparatus based on the detected the user's hand, and
- wherein, when the terminal device is selected through the screen displayed on the terminal device, further comprising:
- receiving, via a camera, an image of the surroundings;
- transmitting the image received through the camera to the terminal device in the second mode, wherein the image is displayed on the terminal device; and
- moving the automatic moving apparatus to a specific position which corresponds to a point of a touch input applied to the image displayed on the terminal device.

* * * * *